(12) United States Patent
Uedaira

(10) Patent No.: US 11,668,865 B2
(45) Date of Patent: Jun. 6, 2023

(54) OPTICAL SENSOR AND ELECTRONIC APPARATUS

(71) Applicant: ROHM CO., LTD., Kyoto (JP)

(72) Inventor: Yoshitsugu Uedaira, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 199 days.

(21) Appl. No.: 17/218,754

(22) Filed: Mar. 31, 2021

(65) Prior Publication Data

US 2021/0311231 A1 Oct. 7, 2021

(30) Foreign Application Priority Data

Apr. 7, 2020 (JP) .............................. JP2020-069027

(51) Int. Cl.
*G02B 5/20* (2006.01)
*G01J 1/04* (2006.01)
*G02B 5/00* (2006.01)

(52) U.S. Cl.
CPC ............ *G02B 5/201* (2013.01); *G01J 1/0488* (2013.01); *G02B 5/003* (2013.01); *G02B 5/208* (2013.01)

(58) Field of Classification Search
CPC ........ G02B 5/003; G02B 5/201; G02B 5/208; G01J 1/0488
See application file for complete search history.

(56) References Cited

U.S. PATENT DOCUMENTS 8,274,051 B1 9/2012 Aswell et al.
2015/0221691 A1* 8/2015 Watanabe ............... G01J 3/513
257/432

* cited by examiner

*Primary Examiner* — Kevin K Pyo
(74) *Attorney, Agent, or Firm* — Fish & Richardson P.C.

(57) ABSTRACT

The subject of the present disclosure is to enhance spectral characteristics.
The present disclosure relates to an optical sensor and an electronic apparatus. The optical sensor includes: multiple optical receivers, multiple color filters covering light receiving surfaces of the multiple optical receivers, and a multi-layer filter layered on the multiple color filters. The multiple color filters include a red color filter, a green color filter and a blue color filter. The multi-layer filter includes a first transmission wavelength region allowing transmission of a portion of the transmission wavelength regions of the green color filter and the blue color filter, and a second transmission wavelength region allowing transmission of a portion of the transmission wavelength region of the red color filter.

19 Claims, 20 Drawing Sheets

|  | Fcl (Lower half-wave width) | Center wavelength | Fch (Upper half-wave width) |
|---|---|---|---|
| First wavelength band | 470 | 492.5 | 515 |
| Second wavelength band | 515 | 535 | 555 |
| Third wavelength band | 660 | 680 | 700 |
| Fourth wavelength band | 420 | 445 | 470 |
| Fifth wavelength band | 555 | 575 | 595 |
| Sixth wavelength band | 620 | 640 | 660 |
| Seventh wavelength band | 825 | 867.5 | 910 |

Unit: nm

FIG.17

OPTICAL SENSOR AND ELECTRONIC APPARATUS

BACKGROUND OF THE INVENTION

Field of the Invention

The present disclosure relates to an optical sensor and an electronic apparatus.

Description of the Prior Art

An optical sensor, which is exemplified by an optical sensor that is commonly known, includes: a substrate, having a plurality of optical receivers formed; a color filter, including a red color filter, a green color filter and a blue color filter separately covering the plurality of optical receivers; and an infrared cutoff filter, covering the color filter (for example, referring to patent document 1).

PRIOR ART DOCUMENT

Patent Publication

[Patent document 1] Specification of U.S. Pat. No. 8,274,051

SUMMARY

Problems to be Solved by the Invention

Considering from perspectives of enhancing detection precision, it is expected in industry that spectral characteristics can be enhanced by means of subdividing a wavelength band detected by an optical sensor.

It is an object of the present disclosure to provide an optical sensor and an electronic apparatus capable of enhancing spectral characteristics.

Technical Means for Solving the Problem

An optical sensor for solving the problem includes: a plurality of optical receivers; a plurality of color filters, covering light receiving surfaces of the plurality of optical receivers; and a multi-layer filter, layered on the plurality of color filters. The plurality of color filters include: a first filter, allowing transmission of light of a first visible light band in a visible light region; and a second filter, allowing transmission of light of a second visible light band in the visible light region. The multi-layer filter includes: a first transmission wavelength region, allowing transmission of a portion of light of the first visible light band; and a second transmission wavelength region, allowing transmission of a portion of light of the second visible light band or a portion of light of an infrared band on a wavelength side longer than the second visible light band.

According to the configuration, the multi-layer filter includes the first transmission wavelength region and the second transmission wavelength region; that is, the multi-layer filter includes a plurality of transmission wavelength regions allowing transmission of light. Thus, a wavelength band to be detected can be subdivided by the layered color filter and multi-layer filter. Therefore, spectral characteristics can be enhanced.

An optical sensor for solving the problem includes: an optical receiver; a color filter, covering a light receiving surface of the optical receiver, and allowing transmission of light of a visible light band; and a multi-layer filter, layered on the color filter. The multi-layer filter includes: a transmission wavelength region, allowing transmission of a portion of light of the visible light band; and a light shielding wavelength region, cutting off light outside the transmission wavelength region in the light of the visible light band.

According to the configuration, transmission of light of a portion of a wavelength band in a visible light band is allowed by means of the transmission wavelength region of the multi-layer filter, and light of the remaining wavelength band in the visible light band is cut off by means of the light shielding wavelength region of the multi-layer filter. Thus, light of a portion of the wavelength band in the visible light band can be detected in the layered structure of the multi-layer filter and the color filter. Moreover, in a situation where light of a visible light band can be detected by the color filter, light of the remaining wavelength band in the visible light band can be detected by means of removing light of a portion of the wavelength band in the visible light band. As such, a visible light band to be detected can be subdivided, thereby enhancing spectral characteristics.

Effect of the Invention

The optical sensor and the electronic apparatus described above are capable of enhancing spectral characteristics.

BRIEF DESCRIPTION OF THE DRAWINGS

FIG. 17 is a table of an example of spectroscopy of a wavelength band by an optical sensor.

DETAILED DESCRIPTION OF THE EMBODIMENTS

Details of the embodiments of an optical sensor are described with the accompanying drawings below.

The embodiments below illustrates specific configurations and methods embodying the technical concepts, but materials, shapes, structures, configurations and sizes of the constituent components are not limited to the embodiments below. Various modifications may be made to the embodiments below.

EMBODIMENTS

An optical sensor 1 according to an embodiment is described with reference to FIG. 1 to FIG. 16 below.

Figure 1:
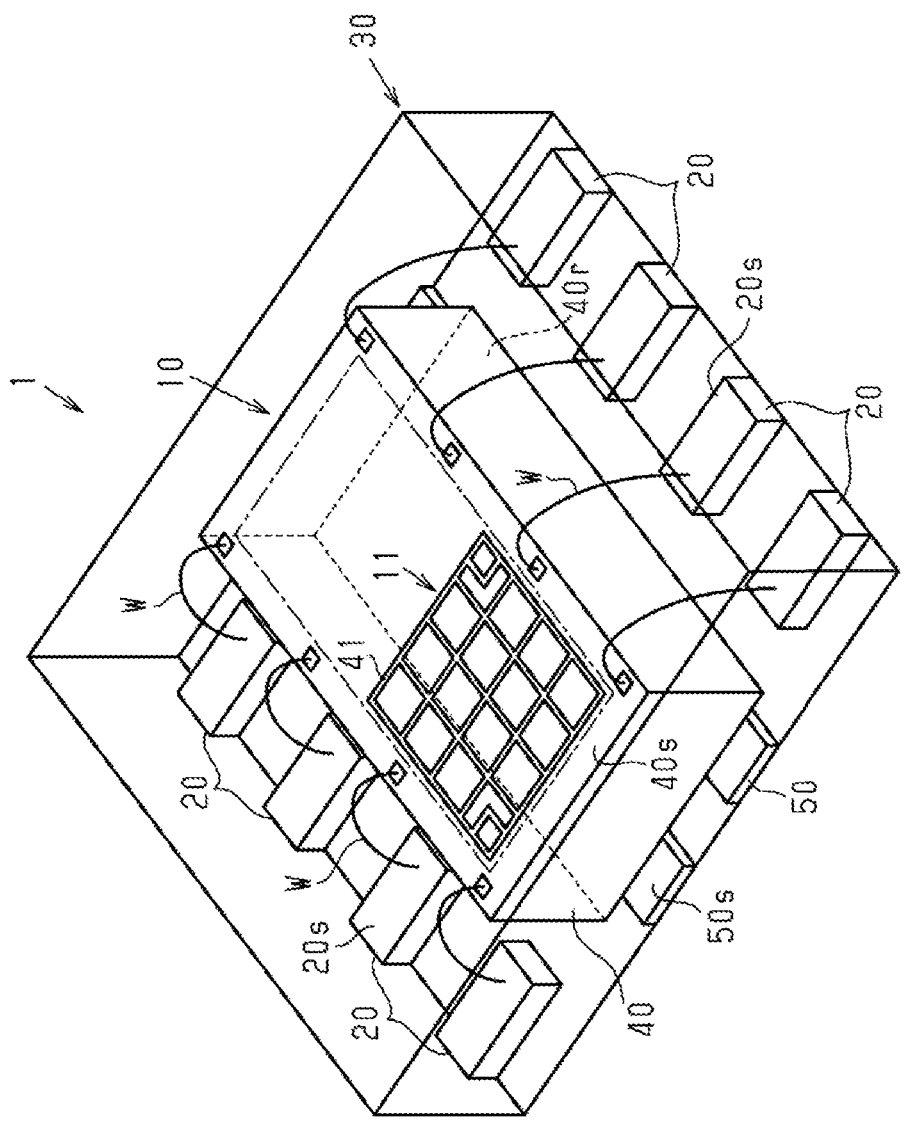
FIG. 1 is a three-dimensional diagram of an optical sensor according to an embodiment.

As shown in FIG. 1, the optical sensor 1 includes: a detection portion 10 shaped as a rectangular plate and used for detecting light; a plurality of (eight in this embodiment) external terminals 20; and a sealing resin 30 that seals the detection portion 10 and the plurality of external terminals 20. In one example, the optical sensor 1 is an illuminance sensor detecting illuminance of ambient light.

The sealing resin 30 forms the outer shape of the optical sensor 1, and is shaped as a cuboid in this embodiment. In the description below, the thickness direction of the sealing resin 30 is set as the z direction, and two directions, which are perpendicular to each other when observed in the z direction, are set as the x direction and the y direction. In this embodiment, the shape of the sealing resin 30 when observed in the z direction is rectangular, that is, the x direction is the lengthwise direction and the y direction is the widthwise direction. The sealing resin 30 includes a light transmissive resin material, for example, including transparent or semi-transparent epoxy resin or silicone resin.

The detection portion 10 includes a semiconductor substrate 40. The semiconductor substrate 40 includes, for example, silicon (Si), and has a substrate main surface 40s and a substrate rear surface 40r mutually facing opposite sides in the z direction. The shape of the detection portion 10 when observed in the z direction is rectangular, that is, the y direction is the lengthwise direction and the x direction is the widthwise direction.

The detection portion 10 includes a light receiving portion 11. The light receiving portion 11 is formed on one side toward the y direction with respect to the center of the detection portion 10 in the y direction. The light receiving portion 11 is formed in a manner of being exposed on the substrate main surface 40s of the semiconductor substrate 40. That is, in the detection portion 10, the substrate main surface 40s of the semiconductor substrate 40 forms the light receiving surface.

Figure 2:
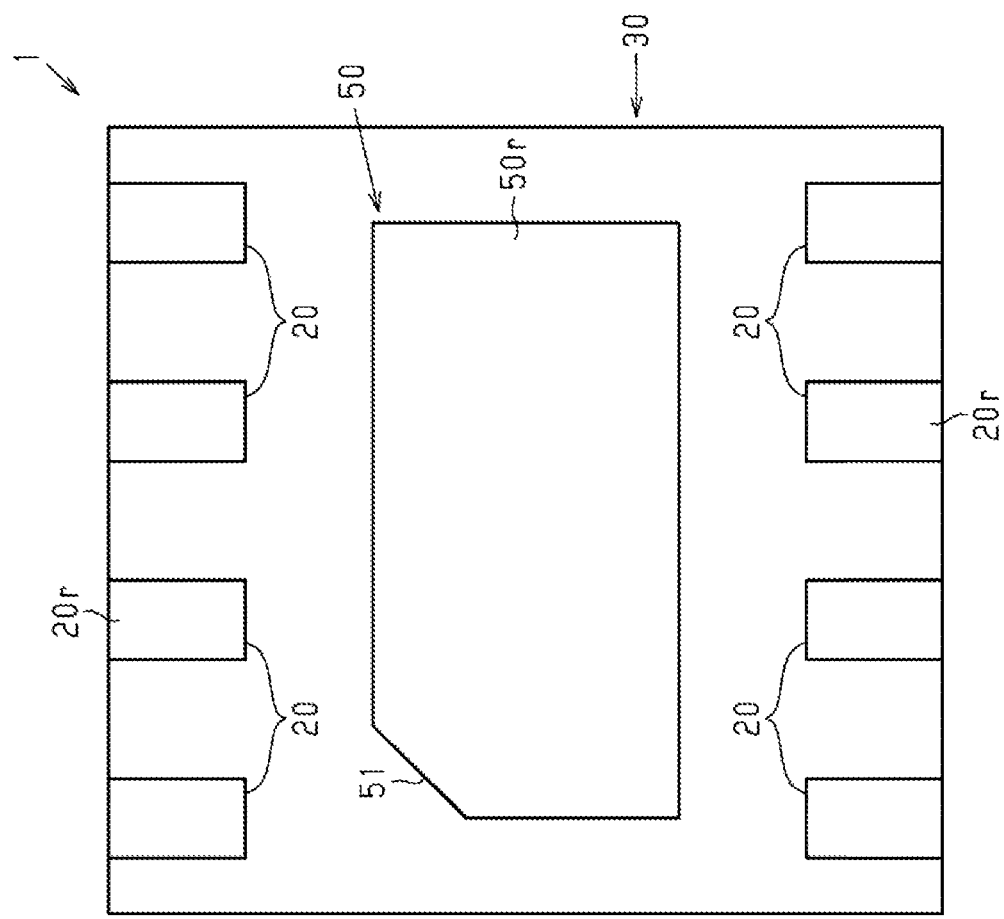
FIG. 2 is a rear view of the optical sensor in FIG. 1.

The detection portion 10 is mounted on a heat dissipation plate 50 made of a metal such as aluminum (Al) and copper (Cu). More specifically, as shown in FIG. 1 and FIG. 2, the heat dissipation plate 50 has a heat dissipation main surface 50s and a heat dissipation rear surface 50r toward opposite sides in the z direction. The detection portion 10 is installed on the heat dissipation main surface 50s of the heat dissipation plate 50 using a conductive bonding material such as solder or silver (Ag) paste. The heat dissipation plate 50 is sealed by the sealing resin 30.

The plurality of external terminals 20 are arranged as four in quantity on each of two sides of the detection portion 10 in the x direction. The four external terminals 20 are aligned with one another in the x direction and arranged at intervals from one another in the y direction. The plurality of external terminals 20 include, for example, a power terminal $V_{CC}$, a ground terminal GND, an interface terminal of a communication bus (e.g., an $I^2C$ bus) and an interrupt output terminal.

As shown in FIG. 1 and FIG. 2, each external terminal 20 is shaped as a rectangular plate, and has a terminal main surface 20s and a terminal rear surface 20r mutually facing opposite sides in the z direction. As shown in FIG. 1, the external terminals 20 and the detection portion 10 are separately connected by, for example, a plurality of (eight in this embodiment) conducting wires W. The conducting wires W are connected to electrodes formed on an outer periphery of the substrate main surface 40s of the semiconductor substrate 40 and the terminal main surfaces 20s of the external terminals 20.

As shown in FIG. 2, the terminal rear surfaces 20r of the plurality of external terminals 20 and the heat dissipation rear surface 50r of the heat dissipation plate 50 are respectively exposed from the sealing resin 30 in the z direction. As such, the optical sensor 1 of this embodiment is in a surface-mounted package structure. Moreover, when observed in the z direction, a notch 51 for a user to identify the direction of the optical sensor 1 is formed on the heat dissipation rear surface 50r.

Figure 3:
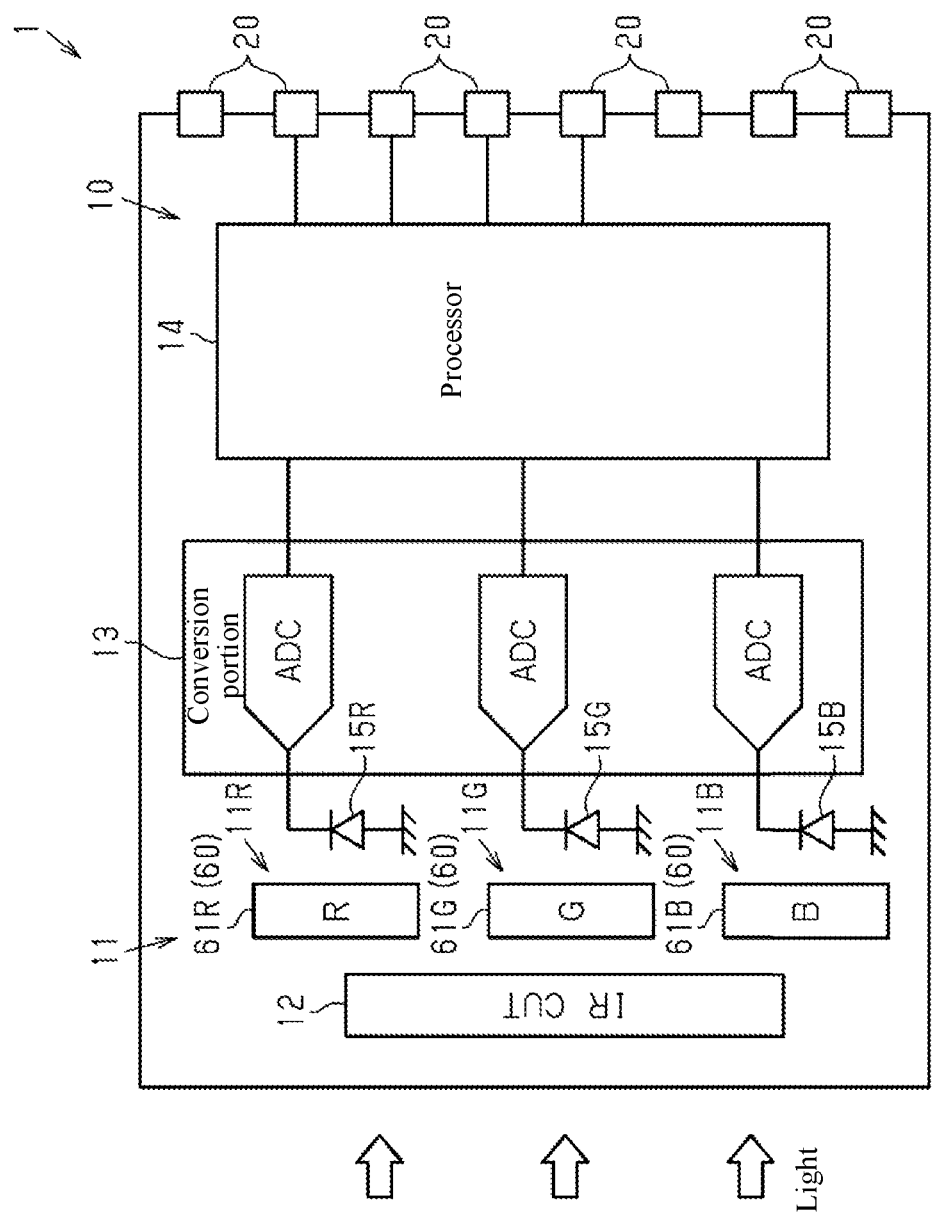
FIG. 3 is a block diagram of an electrical connection structure of the optical sensor in FIG. 1.

FIG. 3 shows an example of a brief structure of the circuit of the optical sensor 1.

As shown in FIG. 3, the optical sensor 1 includes a light receiving portion 11, an infrared cutoff filter 12, a conversion portion 13 and a processor 14. The light receiving portion 11, the conversion portion 13 and the processor 14 form a semiconductor integrated circuit on one semiconductor substrate 40.

The light receiving portion 11 includes a red light receiving portion 11R, a green light receiving portion 11G and a blue light receiving portion 11B for detecting visible light and infrared light. The red light receiving portion 11R includes a photodiode 15R, the green light receiving portion 11G includes a photodiode 15G, and the blue light receiving portion 11B includes a photodiode 15B. The photodiodes 15R, 15G and 15B are electrically connected to the conversion portion 13, respectively. That is, photocurrents that flow as a result of light received by the photodiodes 15R, 15G and 15B are outputted to the conversion portion 13. Further, the red light receiving portion 11R, the green light receiving portion 11G and the blue light receiving portion 11B can include a plurality of photodiodes, respectively.

The infrared cutoff filter 12 covers a portion of the light receiving portion 11, and cuts off infrared light arriving at the light receiving portion 11.

The conversion portion 13 converts an analog signal (a photocurrent) from the light receiving portion 11 to a digital signal and outputs the digital signal to the processor 14. The conversion portion 13 is, for example, an integral analog-to-digital converter (ADC), and includes a plurality of input channels. In this embodiment, the conversion portion 13 is a 3-channel ADC (depicted as ADC in FIG. 3). The conversion portion 13 converts an analog signal from each of the channels to a digital signal.

The processor 14 calculates intensities of visible light and infrared light according to the digital signal from the conversion portion 13. The processor 14 is formed by, for example, an integrated circuit such as a large-scale integration (LSI) circuit, and includes various circuit components such as transistors, capacitors and registers. The processor 14 is electrically connected to the plurality of external terminals 20. Signals from the processor 14 are outputted, and power is inputted to the light receiving portion 11, the conversion portion 13 and the processor 14 via the plurality of external terminals 20.

Figure 4:
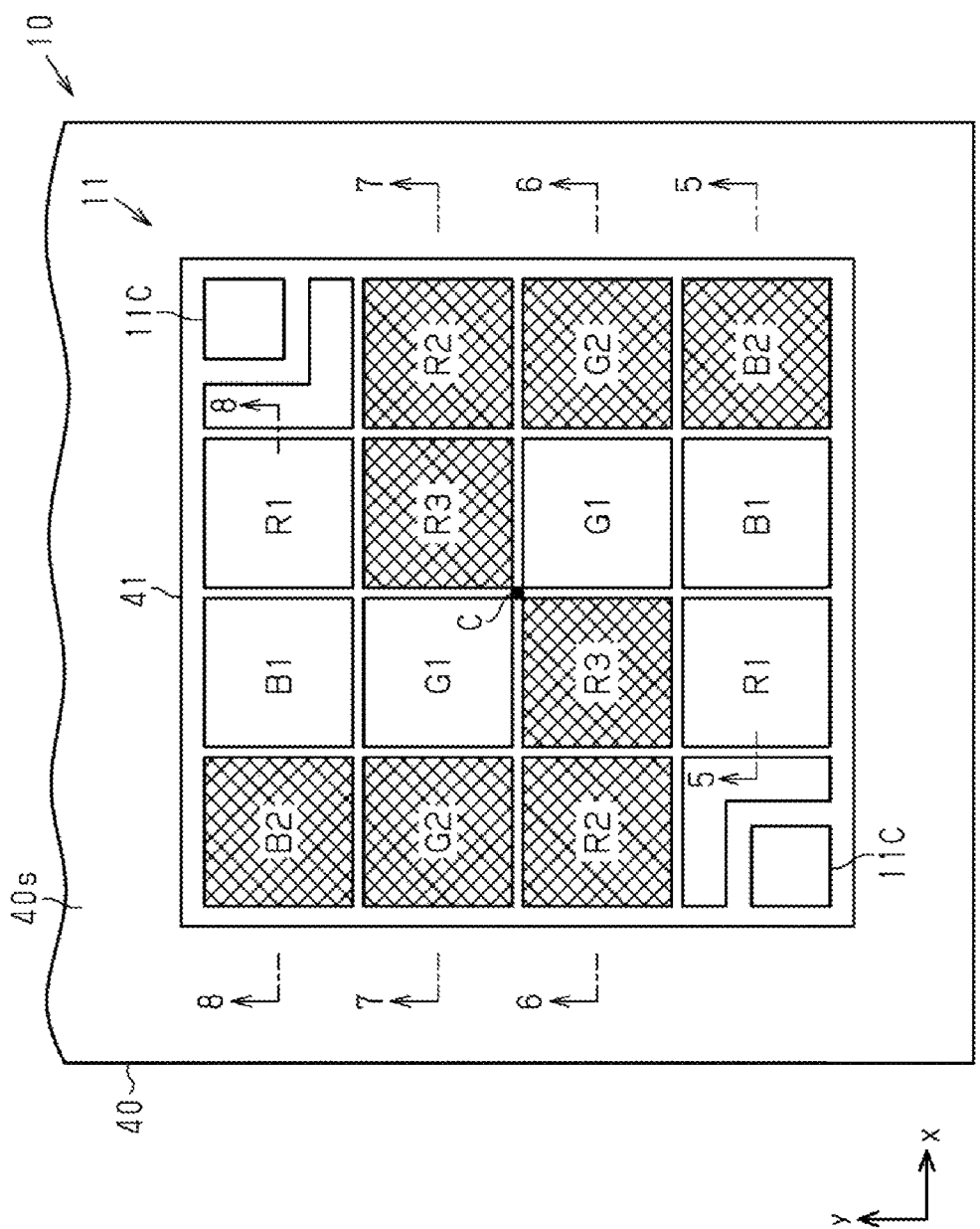
FIG. 4 is a schematic top view of a light receiving portion of the optical sensor in FIG. 1.

FIG. 4 shows a top view of an example of the layout of the light receiving portion 11. Moreover, for better understanding, the electrodes formed on the substrate main surface 40s of the semiconductor substrate 40 and the conducting wires W connected to the electrodes are omitted from FIG. 4.

As shown in FIG. 4, the red light receiving portion 11R, the green light receiving portion 11G and the blue light receiving portion 11B (referring to FIG. 3) include a plurality of light receiving portions, respectively, and are arranged in a light receiving area 41 of the semiconductor substrate 40 for forming the light receiving portion 11. The light receiving area 41 is shaped as a rectangle, when observed in the z direction.

More specifically, the red light receiving portion 11R includes a plurality of (two in this embodiment) signal detection light receiving portions R1 and a plurality of (two in this embodiment) infrared light receiving portions R2 and R3. The green light receiving portion 11G includes a plurality of (two in this embodiment) signal detection light receiving portions G1 and a plurality of (two in this embodiment) infrared light receiving portions G2. The blue light receiving portion 11B includes a plurality of (two in this embodiment) signal detection light receiving portions B1 and a plurality of (two in this embodiment) infrared light receiving portions B2. Among these light receiving portions, the plurality of signal detection light receiving portions R1, G1 and B1 are respectively disposed on dot symmetrical positions relative to a center C (center of gravity) of the light receiving area 41 as a center of symmetry. The plurality of infrared light receiving portions R2, R3, G2 and B2 are similarly disposed on dot symmetrical positions, as shown in FIG. 4.

Further, for clear illustration, numerals of the red light receiving portion 11R, the green light receiving portion 11G and the blue light receiving portion 11B are omitted from FIG. 4, the signal detection light receiving portions R1, G1 and B1 are represented by hollow quadrilaterals, and the infrared light receiving portions R2, R3, G2 and B2 are represented by cross hatched quadrilaterals. These signal detection light receiving portions R1, G1 and B1, and the infrared light receiving portions R2, R3, G2 and B2 are arranged in a matrix.

A transparent light receiving portion 11C capable of receiving visible light and infrared light is formed on a corner of the light receiving area 41. For example, when observed in the z direction, one transparent light receiving portion 11C is provided on each of at least a pair of diagonal corners forming the light receiving region 41. The transparent light receiving portion 11C includes a photodiode and is not covered by the infrared cutoff filter 12 (referring to FIG. 3).

Next, a cross section structure of the light receiving portion 11 is described with reference to FIG. 5 to FIG. 8.

As shown in FIG. 5 to FIG. 8, the red light receiving portion 11R, the green light receiving portion 11G and the blue light receiving portion 11B have the semiconductor substrate 40, an optical receiver 42 and an interlayer insulating film 43 as common elements, wherein the optical receiver 42 is formed on the semiconductor substrate 40, and the interlayer insulating film 43 covers the entire surface of the substrate main surface 40s of the semiconductor substrate 40.

The semiconductor substrate 40 includes a p-type Si substrate. The area of the substrate main surface 40s of the semiconductor substrate 40 is greater than the area of the light receiving area 41, as shown in FIG. 1. The conversion portion 13 and the processor 14 (referring to FIG. 3) are formed on the semiconductor substrate 40. When observed in the z direction, the conversion portion 13 and the processor 14 are formed, in the semiconductor substrate 40, in regions different from the light receiving area 41. In one example, when observed in the z direction, the light receiving area 41 is formed in the portion on one side of the semiconductor substrate 40 close to the y direction; when observed in the z direction, the conversion portion 13 and the processor 14 are respectively formed in the portions on the other side of the semiconductor substrate 40 closer to the y direction than the light receiving area 41.

The p-type semiconductor substrate 40 is connected to ground. More specifically, as shown in FIG. 1, the substrate rear surface 40r of the semiconductor substrate 40 is connected to the heat dissipation plate 50 forming the ground.

As shown in FIG. 5 to FIG. 8, a plurality of optical receivers 42 are formed on the substrate main surface 40s of the p-type semiconductor substrate 40. The plurality of optical receivers 42 have n-type areas 44 respectively formed on the substrate main surface 40s of the p-type semiconductor substrate 40. The n-type areas 44 are formed by doping the substrate main surface 40s of the semiconductor substrate 40 by an n-type impurity. Hence, the plurality of optical receivers 42 respectively include photodiodes PD generating photocurrents. That is, the photodiode PD of the optical receiver 42 of the red light receiving portion 11R forms the photodiode 15R, the photodiode PD of the optical receiver 42 of the green light receiving portion 11G forms the photodiode 15G, and the photodiode PD of the optical receiver 42 of the blue light receiving portion 11B forms the photodiode 15B.

Figure 6:
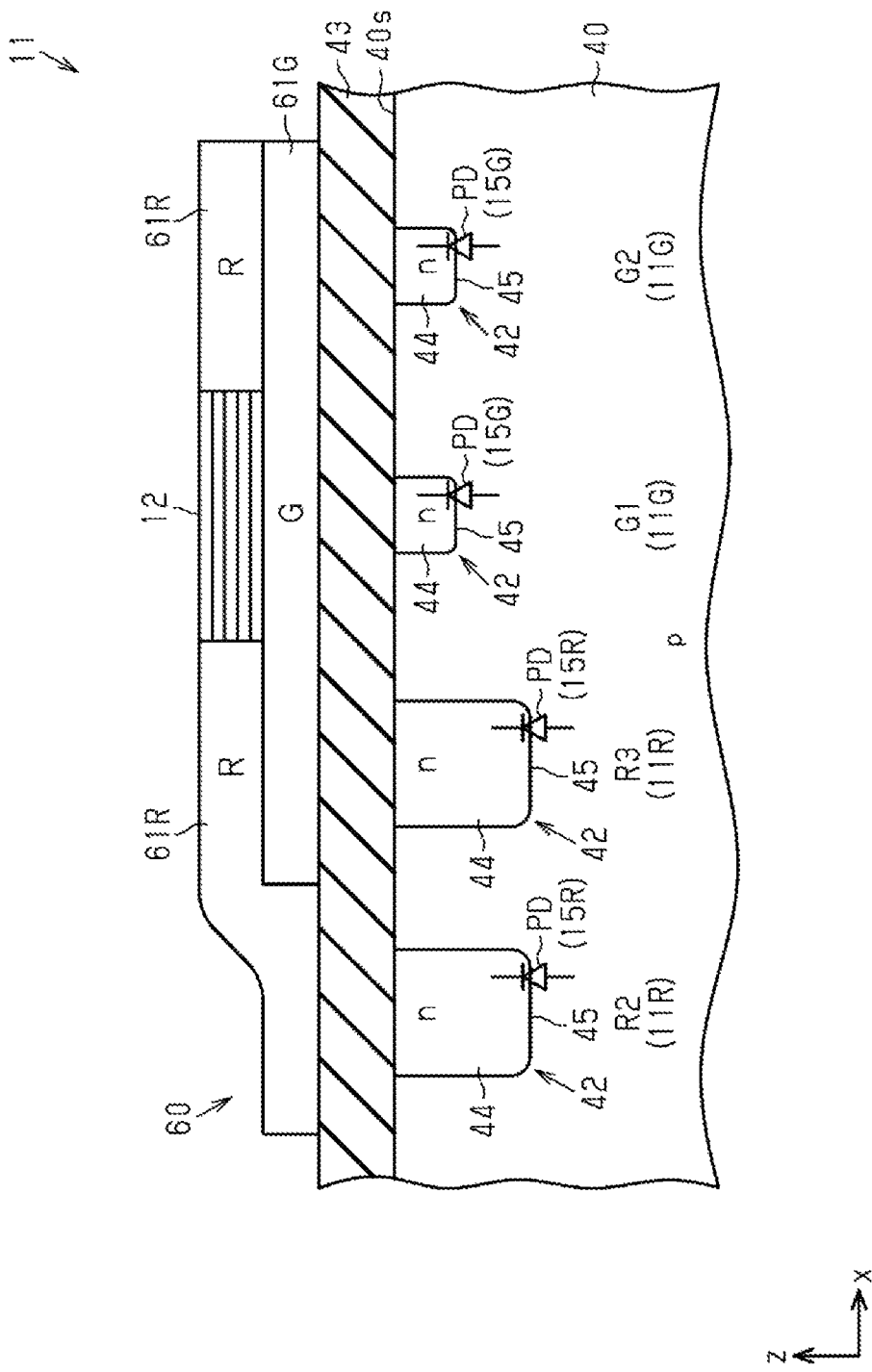
FIG. 6 is a sectional diagram taken along line 6-6 in FIG. 4.
Figure 7:
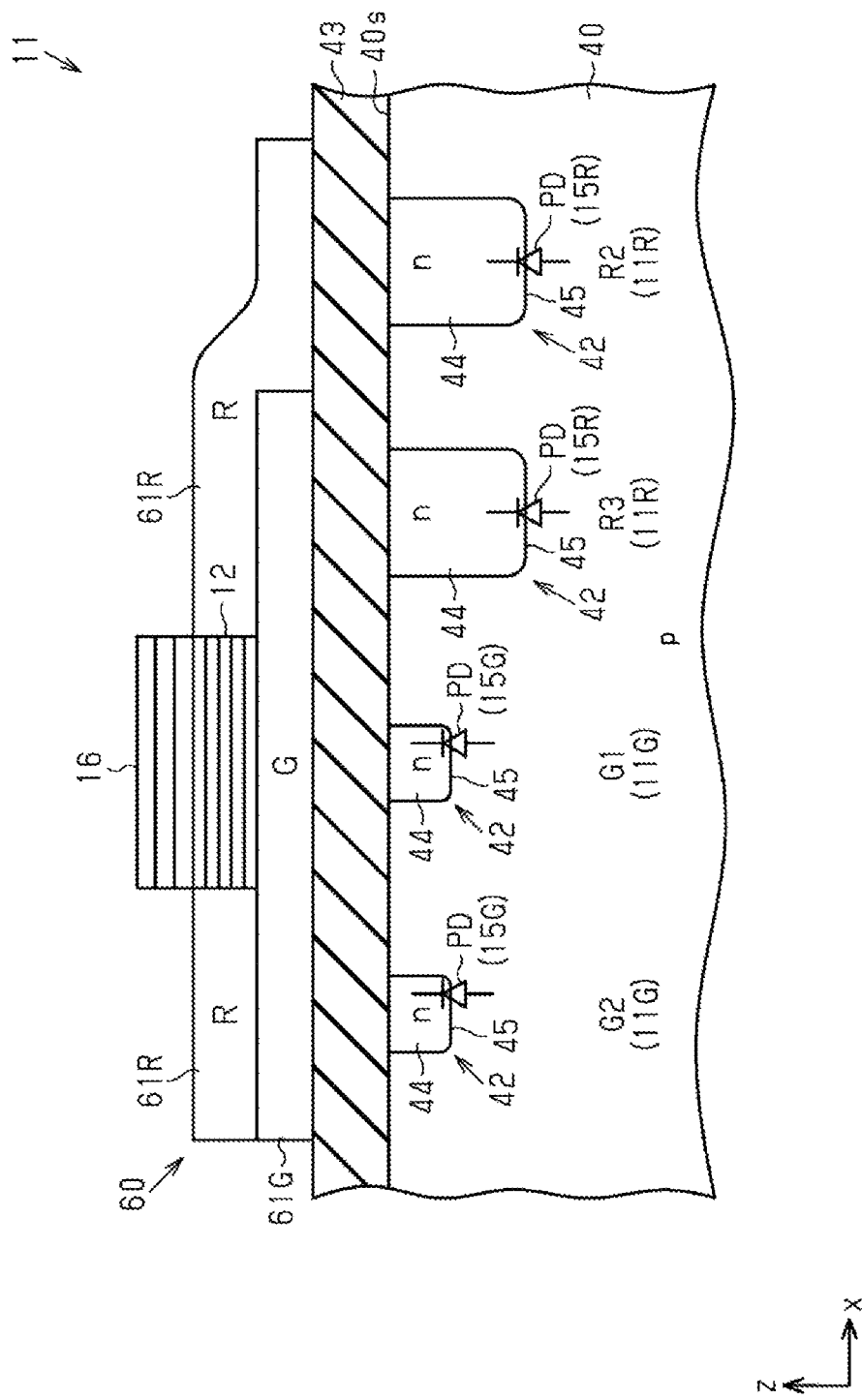
FIG. 7 is a sectional diagram taken along line 7-7 in FIG. 4.

The photodiode PD includes a p-n junction 45 of the p-type semiconductor substrate 40 and the n-type area 44. The n-type areas 44 in the signal detection light receiving portions R1, G1 and B1 and the infrared light receiving portions B2 and G2 are spaced from the substrate main surface 40s (the light receiving surface) of the semiconductor substrate 40 by a depth of about 2 μm. As shown in FIG. 6 and FIG. 7, the depth by which the n-type areas 44 in the infrared light receiving portions R2 and R3 are spaced from the substrate main surface 40s (the light receiving surface) of the semiconductor substrate 40 is greater than the depth by which the n-type areas 44 in the signal detection light receiving portions R1, G1 and B1 and the infrared light receiving portions B2 and G2 are spaced from the substrate main surface 40s (the light receiving surface) of the semiconductor substrate 40.

Moreover, the conversion portion 13 and the processor 14 are formed on the semiconductor substrate 40, and thus, for example, an impurity area forming transistors of the processor 14 can also be formed. In this case, the n-type area 44 can be formed in a same process of an impurity area such as an embedded layer (L/I and B/L) for forming the source region, drain region and element separation region of a transistor.

The interlayer insulating film 43 includes an insulation material such as silicon oxide ($SiO_2$). The interlayer insulating film 43 may be a single-layer or multi-layer structure.

Figure 5:
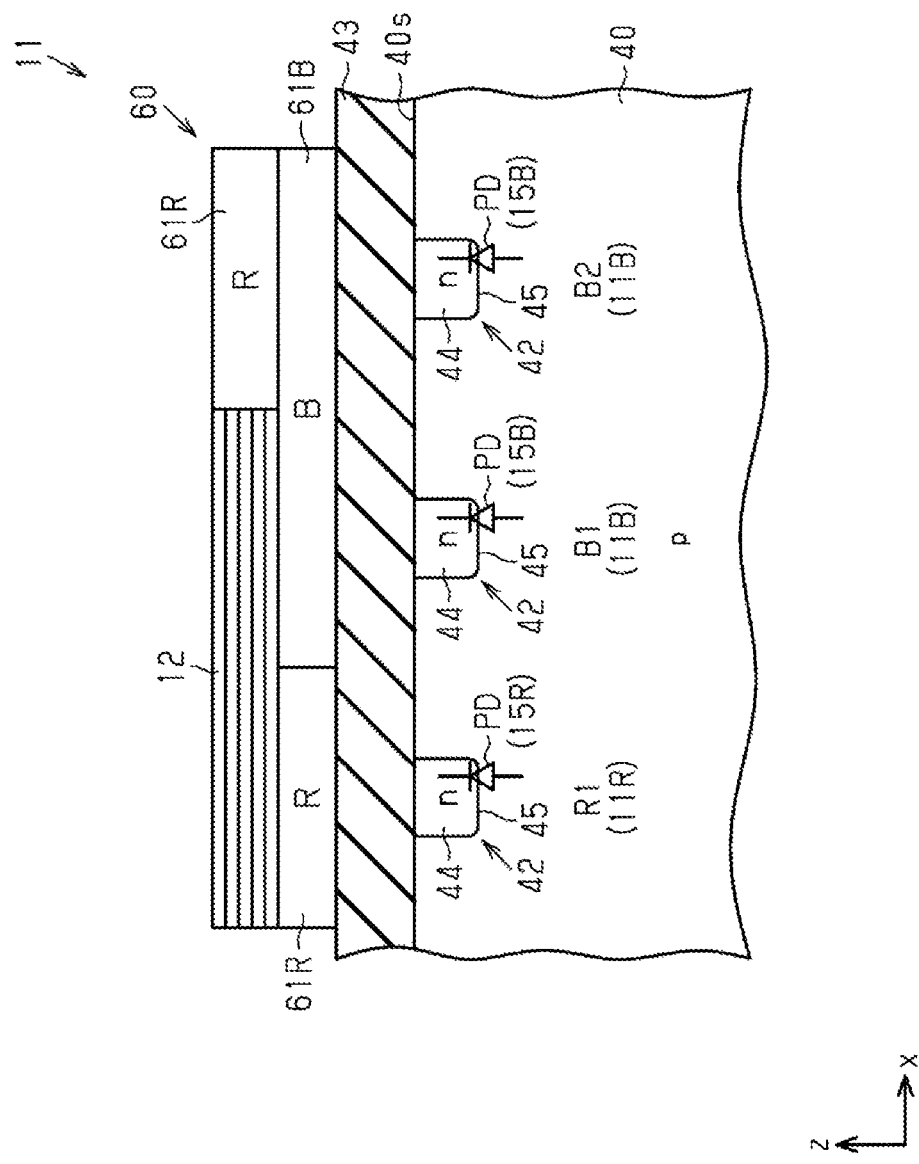
FIG. 5 is a sectional diagram taken along line 5-5 in FIG. 4.

As shown in FIG. 5 and FIG. 6, a plurality of color filters 60 are formed on the interlayer insulating film 43, and these color filters 60 cover the light receiving surfaces (the substrate main surface 40s of the semiconductor substrate 40) of the optical receivers 42. The multiple color filters 60 include a red color filter 61R, a green color filter 61G and a blue color filter 61B. Each color filter 60 includes an organic substance, and may be formed by, for example, a color resist based on pigments, a permeable resist formed using the nanoimprint technology, or a gelatin film.

The infrared cutoff filter 12 covering the color filter 60 is formed on a portion of the color filters 60 among the plurality of color filters 60. The infrared cutoff filter 12 includes a multi-layer dielectric film formed by multiple layers (approximately 50 layers, for example) of a layered structure of $SiO_2$ and titanium oxide ($TiO_2$). The infrared cutoff filter 12 covers each of the signal detection light receiving portion R1 of the red light receiving portion 11R, the signal detection light receiving portion G1 of the green light receiving portion 11G, and the signal detection light receiving portion B1 of the blue light receiving portion 11B. On the other hand, the infrared cutoff filter 12 is formed in a manner of exposing each of the infrared light receiving portions R2 and R3 of the red light receiving portion 11R, the infrared light receiving portion G2 of the green light receiving portion 11G, the infrared light receiving portion B2 of the blue light receiving portion 11B and the transparent light receiving portion 11C (referring to FIG. 4).

FIG. 5 shows a cross section structure of the signal detection light receiving portion R1 of the red light receiving portion 11R, and the signal detection light receiving portion B1 and the infrared light receiving portion B2 of the blue light receiving portion 11B.

The signal detection light receiving portion R1 of the red light receiving portion 11R includes the optical receiver 42, the red color filter 61R covering the light receiving surface of the optical receiver 42, and the infrared cutoff filter 12. The optical receiver 42 of the signal detection light receiving portion R1 corresponds to a first optical receiver.

The red color filter 61R covers the entire light receiving surface of the optical receiver 42 of the red light receiving portion 11R. The red color filter 61R allows transmission of light of a wavelength above the wavelength band corresponding to red visible light (hereinafter referred to as "red wavelength band"), and cuts off light of a wavelength on a wavelength side shorter than the red wavelength band.

The signal detection light receiving portion B1 of the blue light receiving portion 11B is arranged adjacent to the signal detection light receiving portion R1 of the red light receiving portion 11R in the x direction. The signal detection light receiving portion B1 includes the optical receiver 42, the blue color filter 61B covering the light receiving surface of the optical receiver 42, and the infrared cutoff filter 12. Moreover, the infrared light receiving portion B2 of the blue light receiving portion 11B is arranged adjacent to the signal detection light receiving portion B1 in the x direction. The infrared light receiving portion B2 includes the optical receiver 42, the blue color filter 61B covering the light receiving surface of the optical receiver 42, and the red color filter 61R. The optical receiver 42 of the signal detection light receiving portion B1 and the optical receiver 42 of the infrared light receiving portion B2 respectively correspond to a third optical receiver.

The blue color filter 61B covers the entire light receiving surface of the optical receiver 42 of the signal detection light receiving portion B1 and the entire light receiving surface of the optical receiver 42 of the infrared light receiving portion B2. That is, the blue color filter 61B is a common filter of the optical receiver 42 of the signal detection light receiving portion B1 and the optical receiver 42 of the infrared light receiving portion B2. The blue color filter 61B allows transmission of light of a wavelength band corresponding to blue visible light (hereinafter referred to as "blue wavelength band") and light above a specific wavelength (light of above approximately 800 nm in this embodiment) in a wavelength band corresponding to infrared light (hereinafter referred to as "infrared band"), and cuts off light of a wavelength band outside the blue wavelength band and the infrared band.

The infrared cutoff filter 12 is provided on the portion of the blue color filter 61B corresponding to the signal detection light receiving portion B1 in the blue light receiving portion 11B. That is, other color filters 60 such as the red color filter 61R can also be provided on the portion of the blue color filter 61B that does not correspond to the signal detection light receiving portion B1 in the blue light receiving portion 11B.

The red color filter 61R of the infrared light receiving portion B2 is provided on the portion of the blue color filter 61B corresponding to the infrared light receiving portion B2 in the blue light receiving portion 11B. The red color filter 61R covers the entire optical receiver 42 corresponding to the infrared light receiving portion B2 in the blue light receiving portion 11B. That is, the color filter 60 of the infrared light receiving portion B2 in the blue light receiving portion 11B includes a layered structure of the blue color filter 61B and the red color filter 61R. Hence, the color filter 60 of the infrared light receiving portion B2 allows transmission of light above a specific wavelength band (light of above approximately 800 nm in this embodiment) in the infrared band, and cuts off light of a wavelength band lower than the specific wavelength in the infrared band.

FIG. 6 shows a cross section structure of the infrared light receiving portions R2 and R3 of the red light receiving portion 11R, and the signal detection light receiving portion G1 and the infrared light receiving portion G2 of the green light receiving portion 11G.

The signal detection light receiving portion G1 of the green light receiving portion 11G includes the optical receiver 42, the green color filter 61G covering the light receiving surface of the optical receiver 42, and the infrared cutoff filter 12. The infrared light receiving portion G2 of the green light receiving portion 11G includes the optical receiver 42, the green color filter 61G covering the light receiving surface of the optical receiver 42, and the red color filter 61R. The optical receiver 42 of the signal detection light receiving portion G1 and the optical receiver 42 of the infrared light receiving portion G2 respectively correspond to a second optical receiver.

The infrared light receiving portion R2 of the red light receiving portion 11R includes the optical receiver 42, and the red color filter 61R covering the light receiving surface of the optical receiver 42. The infrared light receiving portion R3 of the red light receiving portion 11R includes the optical receiver 42, the green color filter 61G covering the light receiving surface of the optical receiver 42, and the red color filter 61R. The optical receivers 42 of the infrared light receiving portions R2 and R3 respectively correspond to the first optical receiver.

The signal detection light receiving portion G1, and the infrared light receiving portion G2 and the infrared light receiving portion R3 adjacent to the signal detection light receiving portion G1 in the x direction individually include the green color filter 61G, and thus in this embodiment, the green color filter 61G forms a common filter of the optical receiver 42 of the signal detection light receiving portion G1, the optical receiver 42 of the infrared light receiving portion G2 and the optical receiver 42 of the infrared light receiving portion R3. The green color filter 61G is provided on the interlayer insulating film 43, and covers the entire light receiving surface of the optical receivers 42 of the signal detection light receiving portion G1 and the infrared light receiving portions G2 and R3. The green color filter 61G allows transmission of light of a wavelength band corresponding to green visible light (hereinafter referred to as "green wavelength band") and light of above a specific wavelength (light of above approximately 750 nm in this embodiment) in the infrared band, and cuts off light of other wavelength bands.

The portion in the green color filter 61G corresponding to the optical receiver 42 of the signal detection light receiving portion G1 is provided with the infrared cutoff filter 12. The portion in the green color filter 61G corresponding to the optical receiver 42 of the infrared light receiving portion G2 is provided with the red color filter 61R. That is, the color filter 60 of the infrared light receiving portion G2 includes a layered structure of the green color filter 61G and the red color filter 61R. Hence, the color filter 60 of the infrared light receiving portion R3 allows transmission of light above a specific wavelength (light of above approximately 750 nm in this embodiment) in the infrared band, and cuts off light of a wavelength band lower than the specific wavelength in the infrared band.

The infrared light receiving portion R2, and the infrared light receiving portion R3 adjacent to the infrared light receiving portion R2 in the x direction respectively include the red color filter 61R, and thus in this embodiment, the red color filter 61R forms a common filter of the optical receiver 42 of the infrared light receiving portion R2 and the optical receiver 42 of the infrared light receiving portion R3. The portion in the red color filter 61R corresponding to the optical receiver 42 of the infrared light receiving portion R2 is provided on the interlayer insulating film 43, and the portion corresponding to the optical receiver 42 of the infrared light receiving portion R3 is provided on the green color filter 61G. That is, the color filter 60 of the infrared light receiving portion R3 includes a layered structure of the green color filter 61G and the red color filter 61R.

The depth by which the optical receivers 42 of the infrared light receiving portions R2 and R3 are spaced from the substrate main surface 40s of the semiconductor substrate 40 is greater than the depth by which the other optical receivers 42 are spaced from the substrate main surface 40s of the semiconductor substrate 40. Hence, the optical receivers 42 of the infrared light receiving portions R2 and R3 can detect red light and infrared light. In the infrared light receiving portion R3, red light is selectively cut off by the green color filter 61G, and the optical receiver 42 of the infrared light receiving portion R3 detects infrared light. The infrared light receiving portion R2 detects red light and infrared light.

FIG. 7 shows a cross section structure of the infrared light receiving portions R2 and R3 of the red light receiving portion 11R, and the signal detection light receiving portion G1 and the infrared light receiving portion B2 of the green light receiving portion 11G.

The structures of the infrared light receiving portions R2 and R3 of the red light receiving portion 11R and the infrared light receiving portion G2 of the green light receiving portion 11G in FIG. 7 are the same as the structures of the infrared light receiving portions R2 and R3 of the red light receiving portion 11R and the infrared light receiving portion G2 of the green light receiving portion 11G in FIG. 6. On the other hand, the structure of the signal detection light receiving portion G1 of the green light receiving portion 11G in FIG. 7 is different from the structure of the signal detection light receiving portion G1 of the green light receiving portion 11G in FIG. 6.

More specifically, as shown in FIG. 7, the signal detection light receiving portion G1 includes the multi-layer filter 16. The multi-layer filter 16 is configured to allow transmission of light in a wavelength of a specific wavelength band, and cuts off light in other wavelengths. The multi-layer filter 16 includes, for example, a multi-layer dielectric film formed by multiple layers of a layered structure of $SiO_2$ and $TiO_2$. The multi-layer filter 16 can change the wavelength band of light allowed for transmission by modifying the film thicknesses and the numbers of layers of $SiO_2$ and $TiO_2$.

In the signal detection light receiving portion G1, the multi-layer filter 16 is provided on the infrared cutoff filter 12. The multi-layer filter 16 covers the entire infrared cutoff filter 12 of the signal detection light receiving portion G1. In other words, the multi-layer filter 16 covers the entire light receiving surface of the optical receiver 42 of the signal detection light receiving portion G1.

Figure 8:
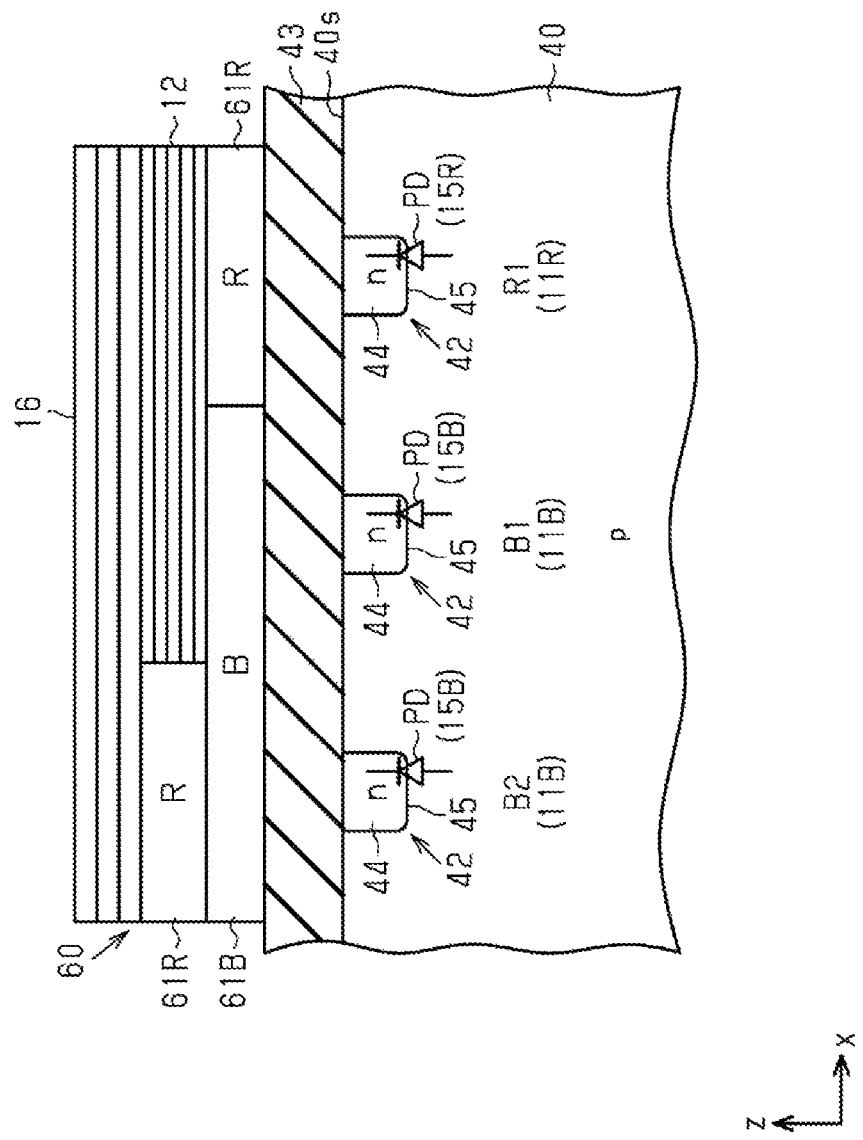
FIG. 8 is a sectional diagram taken along line 8-8 in FIG. 4.

FIG. 8 shows a cross section structure of the signal detection light receiving portion R1 of the red light receiving portion 11R, and the signal detection light receiving portion B1 and the infrared light receiving portion B2 of the blue light receiving portion 11B.

The structures of the signal detection light receiving portion B1 and the infrared light receiving portion B2 of the blue light receiving portion 11B and the signal detection light receiving portion R1 of the red light receiving portion 11R in FIG. 8 are respectively different from the structures of the signal detection light receiving portion B1 and the infrared light receiving portion B2 of the blue light receiving portion 11B and the signal detection light receiving portion R1 of the red light receiving portion 11R in FIG. 5.

More specifically, as shown in FIG. 8, the signal detection light receiving portions B1 and R1 and the infrared light receiving portion B2 respectively include the multi-layer filter 16. In the signal detection light receiving portions B1 and R1, the multi-layer filter 16 is provided on the infrared cutoff filter 12. In the infrared light receiving portion B2, the multi-layer filter 16 is provided on the red color filter 61R. The signal detection light receiving portions B1 and R1 and the infrared light receiving portion B2 are arranged adjacent to one another in the x direction, and thus the multi-layer filter 16 forms a common filter of the signal detection light receiving portions B1 and R1 and the infrared light receiving portion B2. The multi-layer filter 16 covers the entire infrared cutoff filter 12. In other words, the multi-layer filter 16 individually covers the entire light receiving surface of the optical receiver 42 of the signal detection light receiving portion B1 and the entire light receiving surface of the optical receiver 42 of the signal detection light receiving portion R1. Moreover, the multi-layer filter 16 covers the entire light receiving surface of the optical receiver 42 of the infrared light receiving portion B2.

In this embodiment, either the blue color filter 61B or the green color filter 61G corresponds to the first filter, and the first filter allows transmission of light of the first visible light band in the visible light band. In a situation where the blue color filter 61B corresponds to the first filter, the first visible light band is a blue wavelength band, for example, a wavelength band of approximately above 400 nm and below approximately 570 nm. Moreover, in a situation where the green color filter 61G corresponds to the first filter, the first visible light band is a green wavelength band, for example, a wavelength band of approximately above 500 nm and below approximately 610 nm.

Further, in this embodiment, the red color filter 61R corresponds to the second filter, and the second filter allows transmission of light of the second visible light band in the visible light band. Herein, the visible light band is, for example, a wavelength band of above approximately 380 nm and below approximately 800 nm. In this embodiment, the second visible light band is, for example, a red wavelength band above approximately 600 nm and below approximately 750 nm.

Further, in this embodiment, either the blue color filter 61B or the green color filter 61G corresponds to the first filter, and the first filter allows transmission of light of the first visible light band. In a situation where the blue color filter 61B corresponds to the first filter, the first visible light band is, for example, a blue wavelength band. In a situation where the green color filter 61G corresponds to the first filter, the first visible light band is, for example, a green wavelength band. Further, in this embodiment, the red color filter 61R corresponds to the second filter that allows transmission of light of the second visible light band. Herein, the second visible light band is, for example, a red wavelength band.

(Spectral Characteristics)

Figure 9:
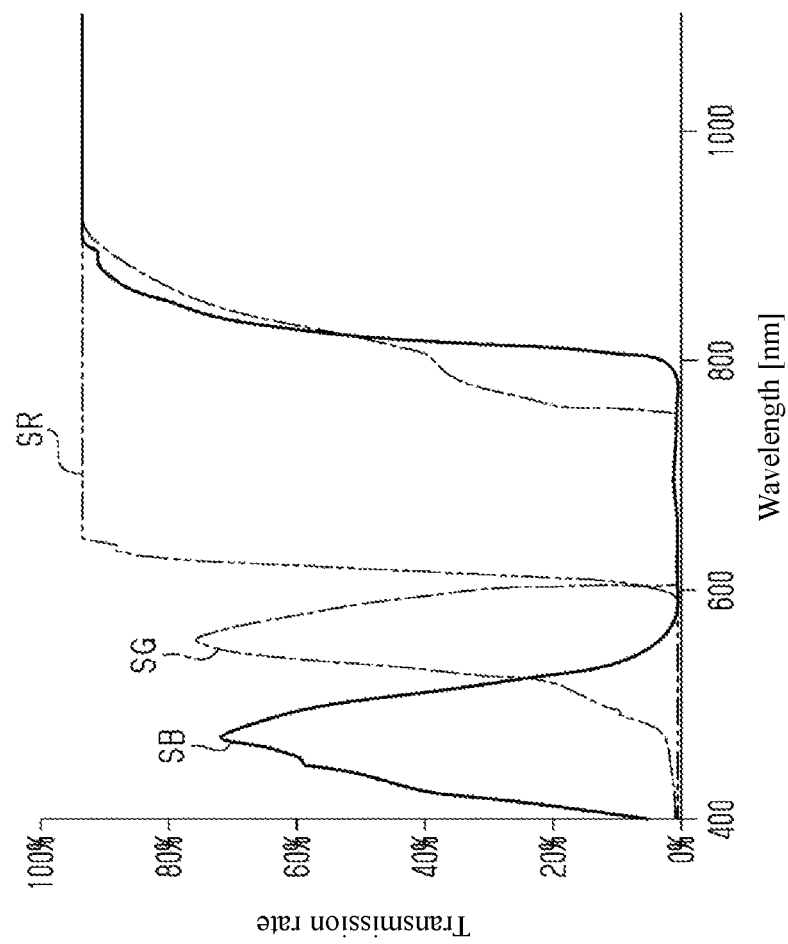
FIG. 9 is a curve diagram of spectral sensitivity curves of color filters.
Figure 10:
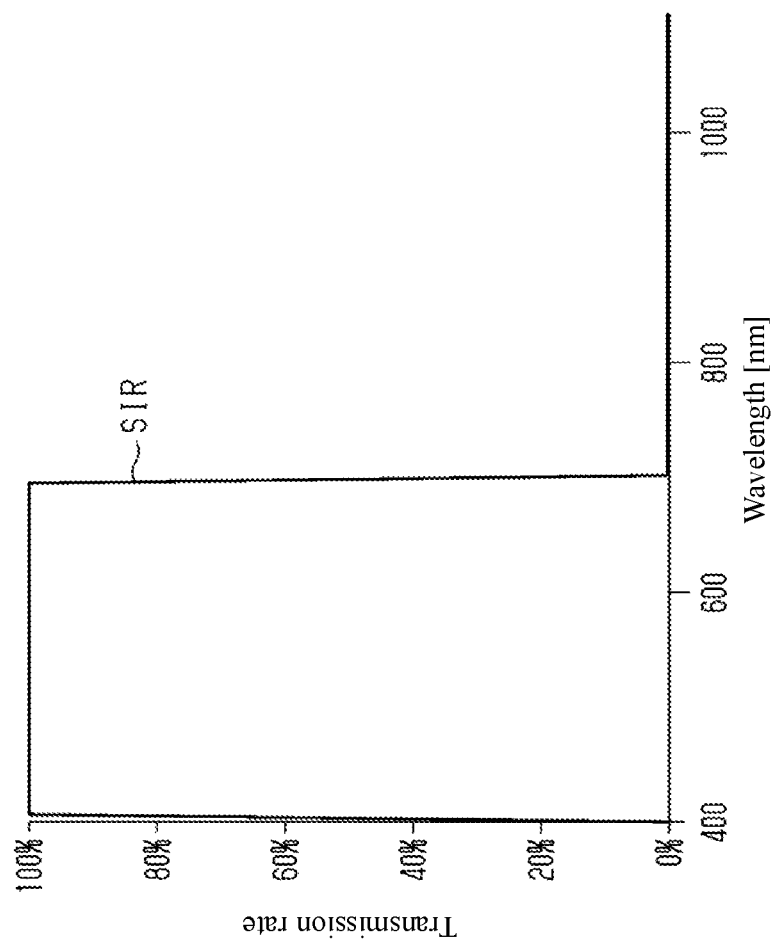
FIG. 10 is a curve diagram of a spectral sensitivity curve of an infrared cutoff filter.
Figure 11:
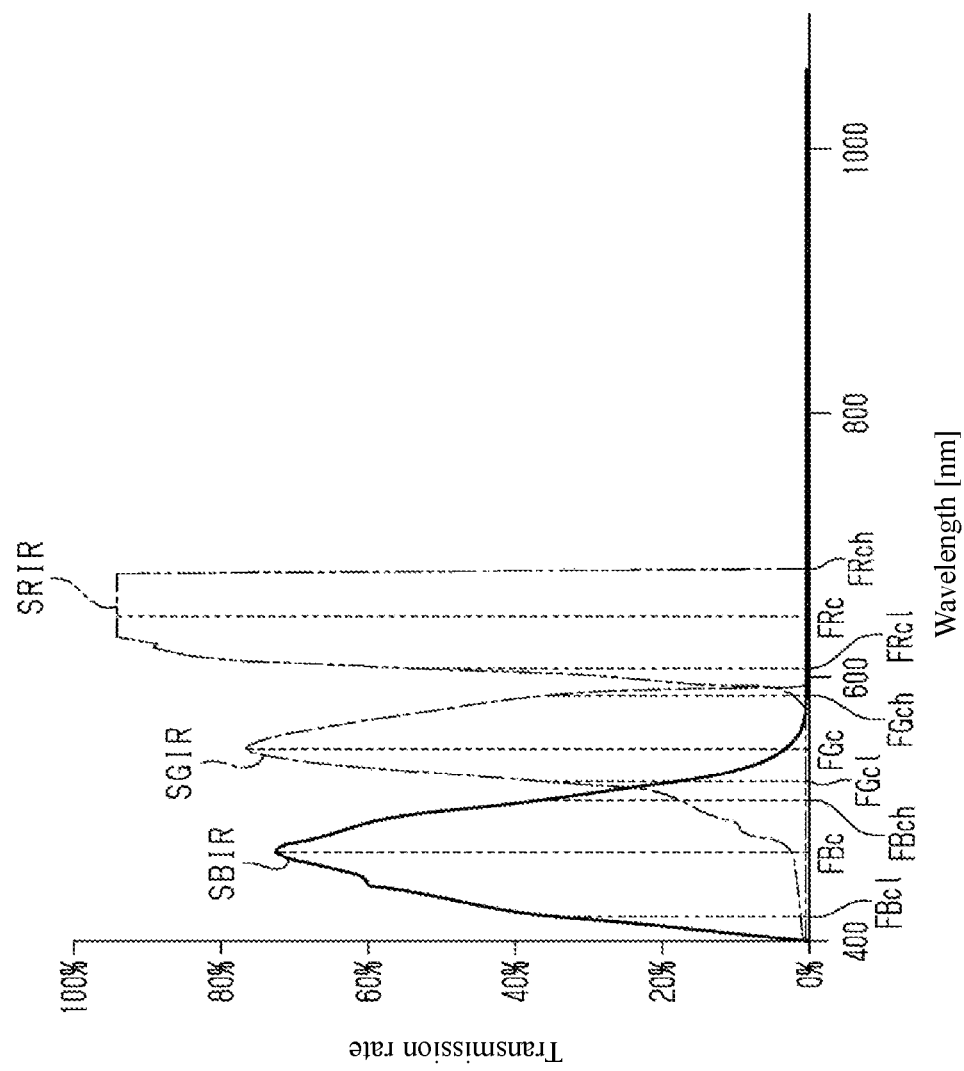
FIG. 11 is a curve diagram of spectral sensitivity curves obtained from a combination of color filters and an infrared cutoff filter.

First of all, referring to FIG. 9 to FIG. 11, spectral sensitivity curves (spectral characteristics of a spectrum) of light transmitting through the color filter 60 and the infrared cutoff filter 12 of the optical sensor 1 are described. In FIG. 9 to FIG. 11, the light transmission rate with respect to a light wavelength is represented in percentage.

FIG. 9 shows spectral sensitivity curves of light transmitting through each single-layer film of the red color filter 61R, the green color filter 61G and the blue color filter 61G. The spectral sensitivity curve transmitting through the single-layer film of the red color filter 61R (hereinafter referred to as "spectral sensitivity curve SR") has a transmission wavelength region of the red wavelength band and above said wavelength band (above approximately 750 nm in this embodiment). The spectral sensitivity curve of light transmitting through the single-layer film of the green color filter 61G (hereinafter referred to as "spectral sensitivity curve SG") has a transmission wavelength region of the green wavelength band (above approximately 500 nm and below approximately 610 nm in this embodiment, and having a center wavelength of approximately 555 nm), and above a specific wavelength (approximately 750 nm in this embodiment) in the infrared band. The spectral sensitivity curve of light transmitting through the single-layer film of the blue color filter 61B (hereinafter referred to as "spectral sensitivity curve SB") has a transmission wavelength region of the blue wavelength band (above approximately 400 nm and below approximately 570 nm in this embodiment, and having a center wavelength of approximately 480 nm), and above a specific wavelength (approximately 800 nm in this embodiment) in the infrared band. Moreover, the center wavelength refers to a wavelength with the maximum transmission rate in the transmission wavelength region of the spectral sensitivity curve.

FIG. 10 shows a spectral sensitivity curve of light transmitting through the infrared cutoff filter 12 (hereinafter referred to as "spectral sensitivity curve SIR"). The spectral sensitivity curve SIR has a transmission wavelength region of a visible light band (above approximately 420 nm and below approximately 700 nm in this embodiment). In other words, the infrared cutoff filter 12 cuts off light in a wavelength other than the visible light band.

FIG. 11 represents spectral sensitivity curves of light transmitting through the red color filter 61R, the green color filter 61G and the blue color filter 61B as well as the infrared cutoff filter 12. That is, FIG. 11 shows spectral sensitivity curves of light, among the light of the spectral sensitivity curves SR, SG and SB, transmitting through the spectral sensitivity curve SIR.

The spectral sensitivity curve of light transmitting through both the red color filter 61R and the infrared cutoff filter 12 (hereinafter referred to as "spectral sensitivity curve SRIR") has a transmission wavelength region of the red wavelength band (above approximately 600 nm and below approximately 700 nm in this embodiment). The transmission wavelength region of the spectral sensitivity curve SRIR is, for example, a wavelength band from the wavelength on the short wavelength side (hereinafter referred to as "minimum wavelength FRcl") to the wavelength on the long wavelength side (hereinafter referred to as "maximum wavelength FRch") of the half-wavelength of the transmitted light amount. In this embodiment, the center wavelength FRc of the transmission wavelength region of the spectral sensitivity curve SRIR is approximately 660 nm.

The spectral sensitivity curve of light transmitting through both the green color filter 61G and the infrared cutoff filter 12 (hereinafter referred to as "spectral sensitivity curve SGIR") has a transmission wavelength region of the green wavelength band (above approximately 500 nm and below approximately 610 nm in this embodiment). The transmission wavelength region of the spectral sensitivity curve SGIR is, for example, a wavelength band from the wavelength on the short wavelength side (hereinafter referred to as "minimum wavelength FGcl") to the wavelength on the long wavelength side (hereinafter referred to as "maximum wavelength FGch") of the half-wavelength of the transmitted light amount. In this embodiment, the center wavelength FGc of the transmission wavelength region of the spectral sensitivity curve SGIR is approximately 555 nm.

The spectral sensitivity curve of light transmitting through both the blue color filter 61B and the infrared cutoff filter 12 (hereinafter referred to as "spectral sensitivity curve SBIR") has a transmission wavelength region of the blue wavelength band (above approximately 400 nm and below approximately 570 nm in this embodiment). The transmission wavelength region of the spectral sensitivity curve SBIR is, for example, a wavelength band from the wavelength on the short wavelength side (hereinafter referred to as "minimum wavelength FBcl") to the wavelength on the long wavelength side (hereinafter referred to as "maximum wavelength FBch") of the half-wavelength of the transmitted light amount. In this embodiment, the center wavelength FBc of the transmission wavelength region of the spectral sensitivity curve SBIR is approximately 480 nm.

Figure 12:
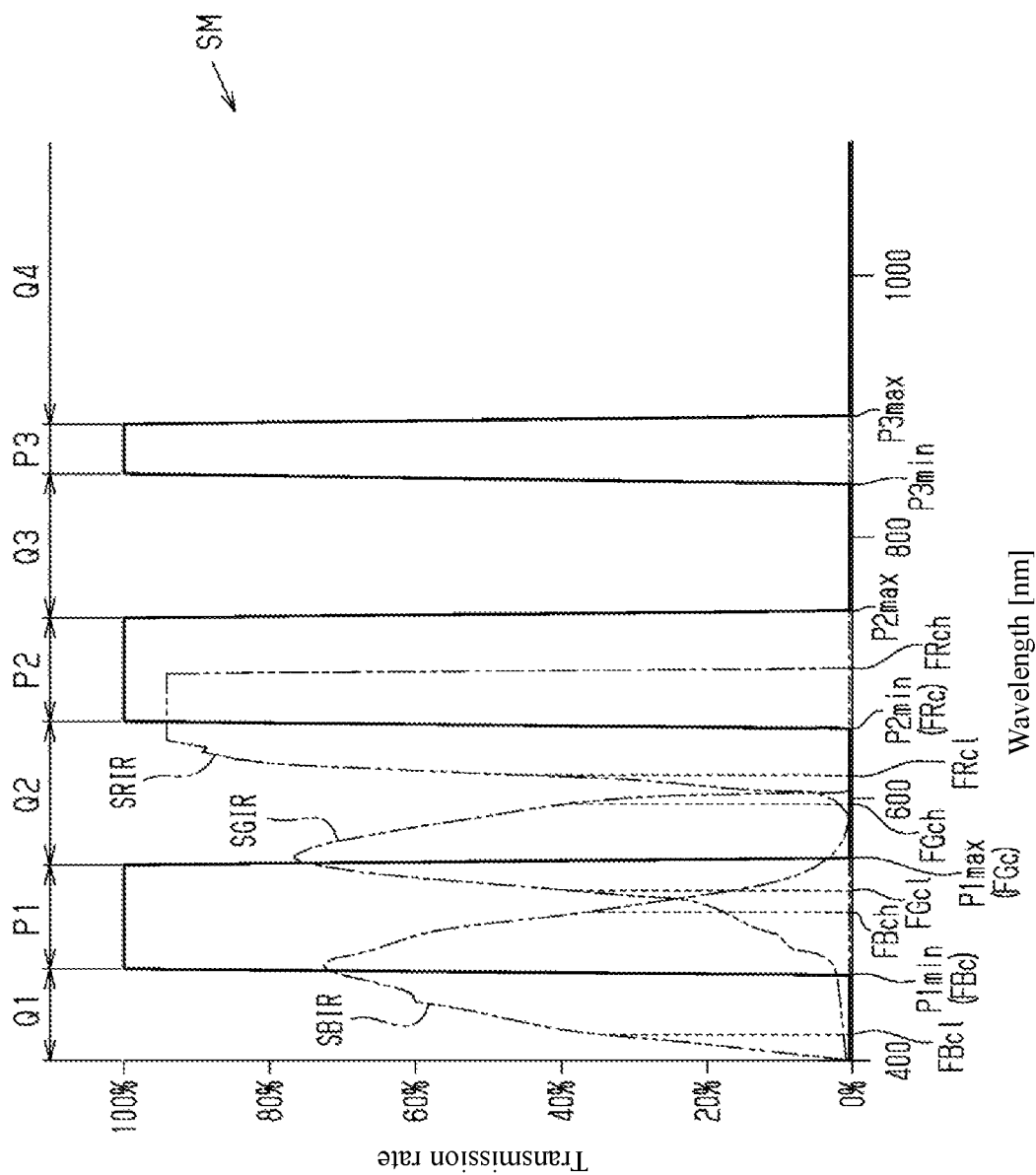
FIG. 12 is a curve diagram of spectral sensitivity curves of a multi-layer filter.
Figure 13:
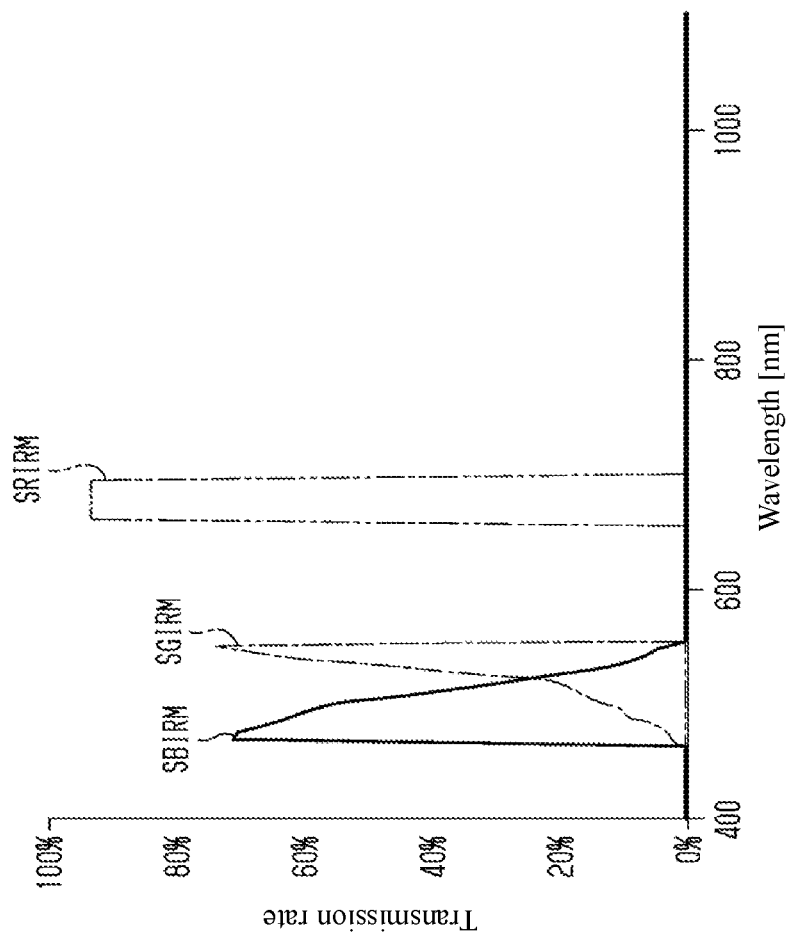
FIG. 13 is a curve diagram of spectral sensitivity curves obtained from a combination of color filters, an infrared cutoff filter and a multi-layer filter.

Next, referring to FIG. 12 and FIG. 13, spectral sensitivity curves of light transmitting through the color filter 60, the infrared cutoff filter 12 and the multi-layer filter 16 are described. In FIG. 12 and FIG. 13, the light transmission rate with respect to a light wavelength is represented in percentage.

The multi-layer filter 16 includes: a transmission wavelength region, allowing transmission of a portion of light of a specific wavelength band in the visible light band transmitting through the color filter 60; and a light shielding wavelength region, cutting off light, in the specific wavelength band, of a wavelength band outside the transmission wavelength region. That is, the specific wavelength band is divided by means of the transmission wavelength region allowing transmission of light and the light shielding wavelength region cutting off light. As such, the multi-layer filter 16 subdivides the specific wavelength band transmitting through the color filter 60.

FIG. 12 shows an example of a spectral sensitivity curve of light transmitting through the multi-layer filter 16 (hereinafter referred to as "spectral sensitivity curve SM").

As shown in FIG. 12, the spectral sensitivity curve SM includes: a first transmission wavelength region P1, allowing transmission of a portion of a blue wavelength band and a portion of a green wavelength band (above approximately 470 nm and below approximately 555 nm in this embodiment); a second transmission wavelength region P2, allowing transmission of a portion of a red wavelength band (above approximately 660 nm and below approximately 750 nm in this embodiment); and a third transmission wavelength region P3, allowing transmission of a portion of an infrared band (above approximately 850 nm and below approximately 900 nm in this embodiment).

Moreover, the multi-layer filter 16 includes: a first light shielding wavelength region Q1, cutting off a wavelength region up to the first transmission wavelength region P1 (that is, a wavelength region less than the minimum wavelength of the first transmission wavelength region P1); a second light shielding wavelength region Q2, cutting off a wavelength region between the first transmission wavelength region P1 and the second transmission wavelength region P2; a third light shielding wavelength region Q3, cutting off a wavelength region between the second transmission wavelength region P2 and the third transmission wavelength region P3; and a fourth light shielding wavelength region Q4, cutting off a wavelength region on the wavelength side longer than the third transmission wavelength region P3. The respective film thicknesses and numbers of layers of $SiO_2$ and $TiO_2$ of the multi-layer filter 16 are set by way of including these first to third transmission wavelength regions P1 to P3 and the first to fourth light shielding wavelength regions Q1 to Q4.

As such, in this embodiment, the multi-layer filter 16 includes the plurality of mutually separated transmission wavelength regions P1 to P3 serving as transmission wavelength regions that allow transmission of light. Further, correspondingly, in this embodiment, the multi-layer filter 16 includes the plurality of light shielding wavelength regions Q1 to Q4 serving as light shielding wavelength regions that cut off light.

The first transmission wavelength region P1 is specified as a wavelength band from a first minimum wavelength P1min to a first maximum wavelength P1max. The first transmission wavelength region P1 overlaps both a portion of the blue wavelength band and a portion of the green wavelength band.

For example, the first minimum wavelength P1min is set on the wavelength side longer than the minimum wavelength FBcl of the spectral sensitivity curve SBIR. In this embodiment, the first minimum wavelength P1min is set to a value closer to the center wavelength FBc of the spectral sensitivity curve SBIR than the minimum wavelength FBcl and the maximum wavelength FBch of the spectral sensitivity curve SBIR. Preferably, the first minimum wavelength P1min is set as the center wavelength FBc of the spectral sensitivity curve SBIR.

On the other hand, the first light shielding wavelength region Q1 cuts off light of a wavelength band on the wavelength side shorter than the first transmission wavelength region P1, and in this embodiment, cuts off light on the wavelength side shorter than the first minimum wavelength P1min. Thus, the first light shielding wavelength region Q1 is set by way of cutting off a portion of light of the transmission wavelength region (the blue wavelength band) of the spectral sensitivity curve SBIR. Specifically, the first light shielding wavelength region Q1 cuts off, in the blue wavelength band, light outside the first transmission wavelength region P1. Hence, the detection portion 10 (referring to FIG. 1) can detect light of the blue wavelength band having a wavelength above the first minimum wavelength P1min. As such, a portion of light of the blue wavelength band is transmitted and the remaining portion of light of the blue wavelength band is cut off by means of the first transmission wavelength region P1 and the first light shielding wavelength region Q1. That is, the first transmission wavelength region P1 and the first light shielding wavelength region Q1 are set by way of dividing the blue wavelength band. More specifically, in the blue wavelength band, light of a wavelength band above the center wavelength FBc is transmitted and light of a wavelength band below the center wavelength FBc is cut off by means of the first transmission wavelength region P1 and the first light shielding wavelength region Q1. That is, the first transmission wavelength region P1 and the first light shielding wavelength region Q1 are set by way of setting the center wavelength FBc of the blue wavelength band as the center and dividing the blue wavelength band into two parts.

For example, the first maximum wavelength P1max of the first transmission wavelength region P1 is set on the wavelength side longer than the minimum wavelength FGcl of the spectral sensitivity curve SGIR. In this embodiment, the first maximum wavelength P1max is set to a value closer to the center wavelength FGc of the spectral sensitivity curve SGIR than the minimum wavelength FGcl and the maximum wavelength FGch of the spectral sensitivity curve SGIR. Preferably, the first maximum wavelength P1max is set as the center wavelength FGc of the spectral sensitivity curve SGIR.

The second transmission wavelength region P2 is set on the wavelength side longer than the first transmission wavelength region P1, and the second light shielding wavelength region Q2 is set between the first transmission wavelength region P1 and the second transmission wavelength region P2. More specifically, the second light shielding wavelength region Q2 is specified as a wavelength band from the first maximum wavelength P1max of the first transmission wavelength region P1 to a second minimum wavelength P2min of the second transmission wavelength region P2. However, the second light shielding wavelength region Q2 does not include each of the first maximum wavelength P1max and the second minimum wavelength P2min. Thus, in the green wavelength band, light outside the first transmission wavelength region P1 is cut off by the second light shielding wavelength region Q2. That is, the second light shielding wavelength region Q2 cuts off light of a wavelength band on a wavelength side longer than the first transmission wavelength region P1, and in this embodiment, cuts off light on the wavelength side longer than the first maximum wavelength P1max. Thus, the second light shielding wavelength region Q2 is set by way of cutting off a portion of light of the transmission wavelength region (the green wavelength band) of the spectral sensitivity curve SGIR. Specifically, the second light shielding wavelength region Q2 cuts off, in the green wavelength band, light outside the first transmission wavelength region P1. Hence, the detection portion 10 can detect light of the green wavelength band having a wavelength below the first maximum wavelength P1max. As such, a portion of light of the green wavelength band is transmitted and the remaining portion of light of the green wavelength band is cut off by means of the first transmission wavelength region P1 and the second light shielding wavelength region Q2. That is, the first transmission wavelength region P1 and the second light shielding wavelength region Q2 are set by way of dividing the green wavelength band. More specifically, in the green wavelength band, light of a wavelength band below the center wavelength FGc is transmitted and light of a wavelength band lower than the center wavelength FGc is cut off by means of the first transmission wavelength region P1 and the second light shielding wavelength region Q2. That is, the first transmission wavelength region P1 and the second light shielding wavelength region Q2 are set by way of setting the center wavelength FGc of the green wavelength band as the center and dividing the green wavelength band into two parts.

The second transmission wavelength region P2 is specified as a wavelength band from a second minimum wavelength P2min to a second maximum wavelength P2max. The second transmission wavelength region P2 overlaps the red wavelength band.

For example, the second minimum wavelength P2min is set on the wavelength side longer than the minimum wavelength FRcl of the spectral sensitivity curve SRIR. In this embodiment, the second minimum wavelength P2min is set to a value closer to the center wavelength FRc of the spectral sensitivity curve SRIR than the minimum wavelength FRcl and the maximum wavelength FRch of the spectral sensitivity curve SRIR. Preferably, the second minimum wavelength P2min is set as the center wavelength FRc of the spectral sensitivity curve SRIR.

On the other hand, the second light shielding wavelength region Q2 cuts off light of a wavelength band on a wavelength side shorter than the second transmission wavelength region P2 as described above, and in this embodiment, cuts off light on the wavelength side shorter than the second minimum wavelength P2min. Thus, the second light shielding wavelength region Q2 is set by way of cutting off a portion of light of the transmission wavelength region (the red wavelength band) of the spectral sensitivity curve SRIR. Specifically, the second light shielding wavelength region Q2 cuts off, in the red wavelength band, light outside the second transmission wavelength region P2. Hence, the detection portion 10 can detect light of the red wavelength band having a wavelength above the second minimum wavelength P2min. As such, a portion of light of the red wavelength band is transmitted and the remaining portion of light of the red wavelength band is cut off by means of the second transmission wavelength region P2 and the second light shielding wavelength region Q2. That is, the second transmission wavelength region P2 and the second light shielding wavelength region Q2 are set by way of dividing the red wavelength band. More specifically, in the red wavelength band, light of a wavelength band above the center wavelength FRc is transmitted and light of a wavelength band below the center wavelength FRc is cut off by means of the second transmission wavelength region P2 and the second light shielding wavelength region Q2. That is, the second transmission wavelength region P2 and the second light shielding wavelength region Q2 are set by way of setting the center wavelength FRc of the red wavelength band as the center and dividing the red wavelength band into two parts.

The third transmission wavelength region P3 is set on the wavelength side longer than the second transmission wavelength region P2, and overlaps the infrared band. The third transmission wavelength region P3 is specified as a wavelength band from a third minimum wavelength P3min to a third maximum wavelength P3max.

For example, in the infrared band, the third minimum wavelength P3min is set on the wavelength side longer than the wavelength at which the transmission rate starts increasing in the infrared band on the spectral sensitivity curve SB shown in FIG. 10. Further, in the infrared band, the third minimum wavelength P3min is set on the wavelength side shorter than the wavelength at which the increase in the transmission rate ends in the infrared band on the spectral sensitivity curve SB. In this embodiment, the third minimum wavelength P3min is set at the wavelength band having a higher transmission rate (for example, the wavelength band having a transmission rate of more than 60%) in the infrared band on the spectral sensitivity curve SB.

For example, in the wavelength band of infrared light, the third maximum wavelength P3max of the third transmission wavelength region P3 is set near the maximum transmission rate on the spectral sensitivity curve SB. In one example, the third minimum wavelength P3min of the third transmission wavelength region P3 is approximately 825 nm, and the third maximum wavelength P3max is approximately 910 nm.

The third light shielding wavelength region Q3 is set between the second transmission wavelength region P2 and the third transmission wavelength region P3. More specifically, the third light shielding wavelength region Q3 is specified as a wavelength band from the second maximum wavelength P2max of the second transmission wavelength region P2 to the third minimum wavelength P3min of the third transmission wavelength region P3. However, the third light shielding wavelength region Q3 does not include each of the second maximum wavelength P2max and the third minimum wavelength P3min.

The fourth light shielding wavelength region Q4 is specified as a wavelength band on a wavelength side longer than the third maximum wavelength P3max of the third transmission wavelength region P3.

As such, a portion of light of the infrared band is transmitted and the remaining portion of light of the infrared band is cut off by means of the third transmission wavelength region P3, the third light shielding wavelength region Q3 and the fourth light shielding wavelength region Q4. That is, in the infrared band, light outside the third transmission wavelength region P3 is cut off by means of the third transmission wavelength region P3, the third light shielding wavelength region Q3 and the fourth light shielding wavelength region Q4. In other words, in the infrared band, only transmission of light in the third transmission wavelength region P3 is allowed by means of the third transmission wavelength region P3, the third light shielding wavelength region Q3 and the fourth light shielding wavelength region Q4.

FIG. 13 shows an example of spectral sensitivity curves of light transmitting through the red color filter 61R, the green color filter 61G and the blue color filter 61B as well as the infrared cutoff filter 12 and the multi-layer filter 16. That is, among the light of spectral sensitivity curves SRIR, SGIR and SBIR, the spectral sensitivity curve of light transmitting through the spectral sensitivity curve SM is indicated.

The spectral sensitivity curve of all the light transmitting through the red color filter 61R, the infrared cutoff filter 12 and the multi-layer filter 16 (hereinafter referred to as "spectral sensitivity curve SRIRM") has a transmission wavelength region of a portion of the red wavelength band (above approximately 660 nm and below approximately 700 nm in this embodiment). More specifically, the spectral sensitivity curve SRIRM has, in the red wavelength band, the wavelength band above the center wavelength FRc of the red wavelength band as a transmission wavelength region. That is, the spectral sensitivity curve SRIRM cuts off, in the light of the spectral sensitivity curve SRIR, light of a wavelength band above approximately 555 nm and below approximately 660 nm by means of the second transmission wavelength region P2 of the spectral sensitivity curve SM.

The spectral sensitivity curve of all the light transmitting through the green color filter 61G, the infrared cutoff filter 12 and the multi-layer filter 16 (hereinafter referred to as "spectral sensitivity curve SGIRM") has a transmission wavelength region of a portion of the green wavelength band (above approximately 470 nm and below approximately 555 nm in this embodiment). More specifically, the spectral sensitivity curve SGIRM has, in the green wavelength band, the wavelength band below the center wavelength FGc of the green wavelength band as a transmission wavelength region. That is, the spectral sensitivity curve SGIRM cuts off, in the light of the spectral sensitivity curve SGIR, light of a wavelength band above approximately 555 nm and below approximately 470 by means of the first transmission wavelength region P1 of the spectral sensitivity curve SM.

The spectral sensitivity curve of all the light transmitting through the blue color filter 61B, the infrared cutoff filter 12 and the multi-layer filter 16 (hereinafter referred to as "spectral sensitivity curve SBIRM") has a transmission wavelength region of a portion of the blue wavelength band (above approximately 470 nm and below approximately 555 nm in this embodiment). More specifically, the spectral sensitivity curve SBIRM has, in the blue wavelength band, the wavelength band above the center wavelength FBc of the blue wavelength band as a transmission wavelength region. That is, the spectral sensitivity curve SBIRM cuts off, in the light of the spectral sensitivity curve SBIR, light of a wavelength band above approximately 555 nm and below approximately 470 by means of the first transmission wavelength region P1 of the spectral sensitivity curve SM.

Next, the spectral sensitivity curves of light transmitting through the multi-layer filter 16 and the color filter 60 in the infrared light receiving portion B2 of the blue light receiving portion 11B are described below.

Figure 14:
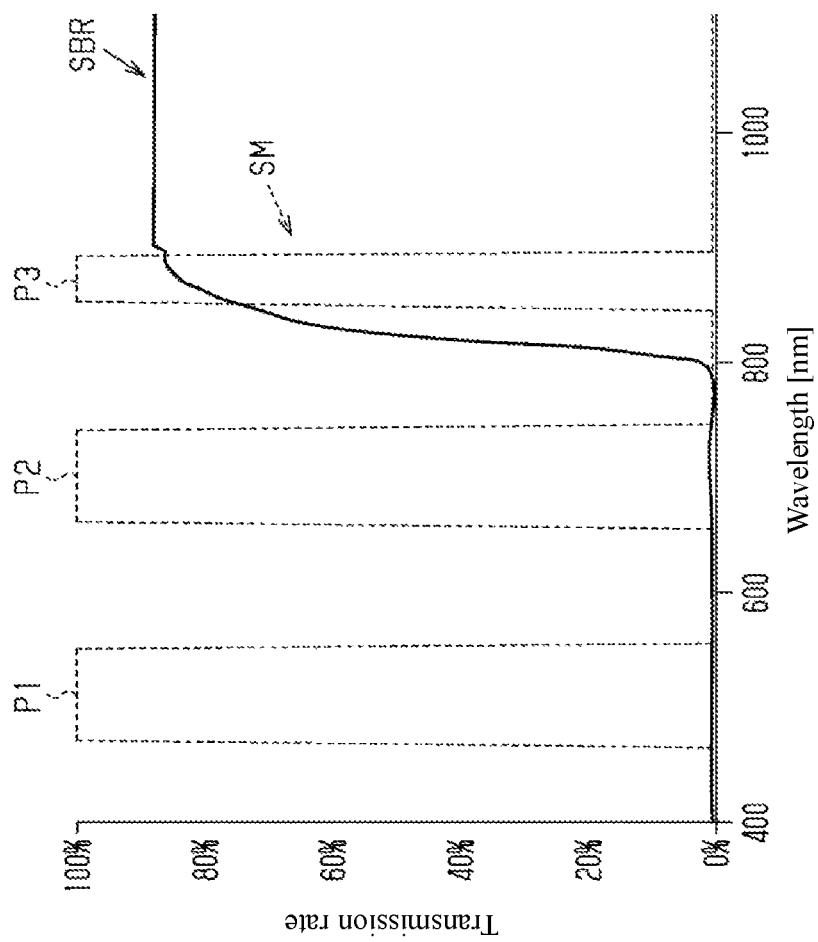
FIG. 14 is a curve diagram of spectral sensitivity curves obtained from a combination of a red color filter and a blue color filter.

As shown in FIG. 14, a spectral sensitivity curve SBR (the solid curve) of light transmitting through the blue color filter 61B and the red color filter 61R in the infrared light receiving portion B2 cuts off light of the red wavelength band by the blue color filter 61B, and thus has a transmission wavelength region above the infrared band (above approximately 800 nm in this embodiment).

Figure 15:
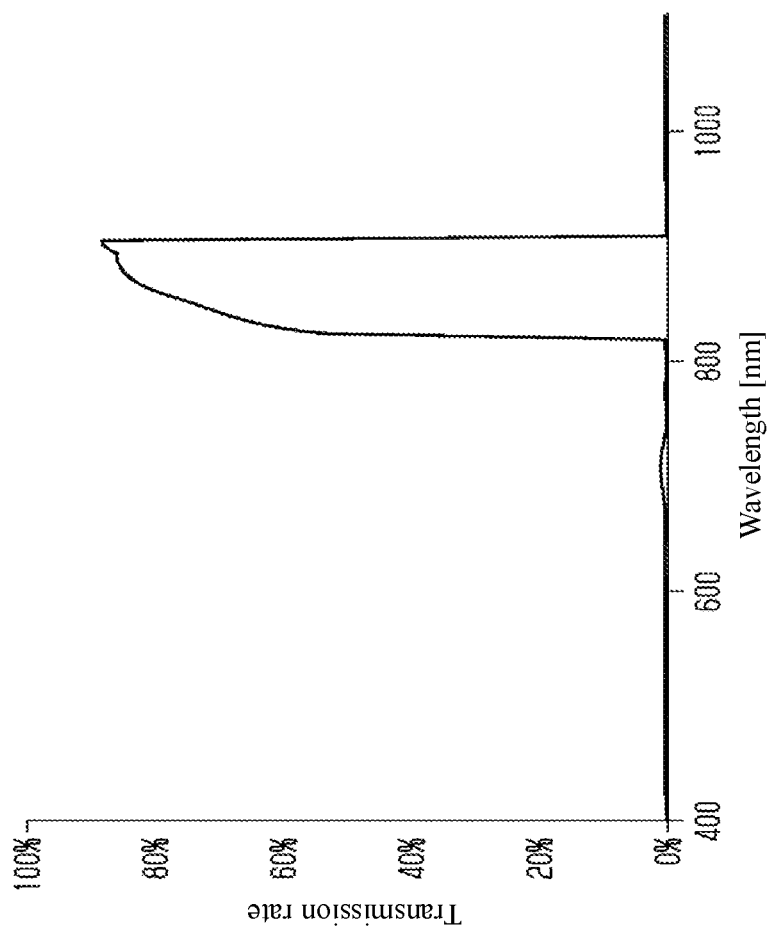
FIG. 15 is a curve diagram of a spectral sensitivity curve obtained from a combination of a red color filter, a blue color filter and a multi-layer filter.

As shown in FIG. 15, the spectral sensitivity curve of light transmitting through the green color filter 61G, the red color filter 61R and the multi-layer filter 16 has, in the transmission wavelength region of the spectral sensitivity curve SBR (the solid curve in FIG. 14), a portion of the infrared band as a transmission wavelength region. That is, the spectral sensitivity curve of the light transmitting through the blue color filter 61B, the red color filter 61R and the multi-layer filter 16 cuts off light in a wavelength below approximately 825 nm and in a wavelength on the wavelength side longer than 910 nm by means of the fourth light shielding wavelength region Q4 of the spectral sensitivity curve SM.

(Spectral Processing Method Using the Processor 14)

Figure 16:
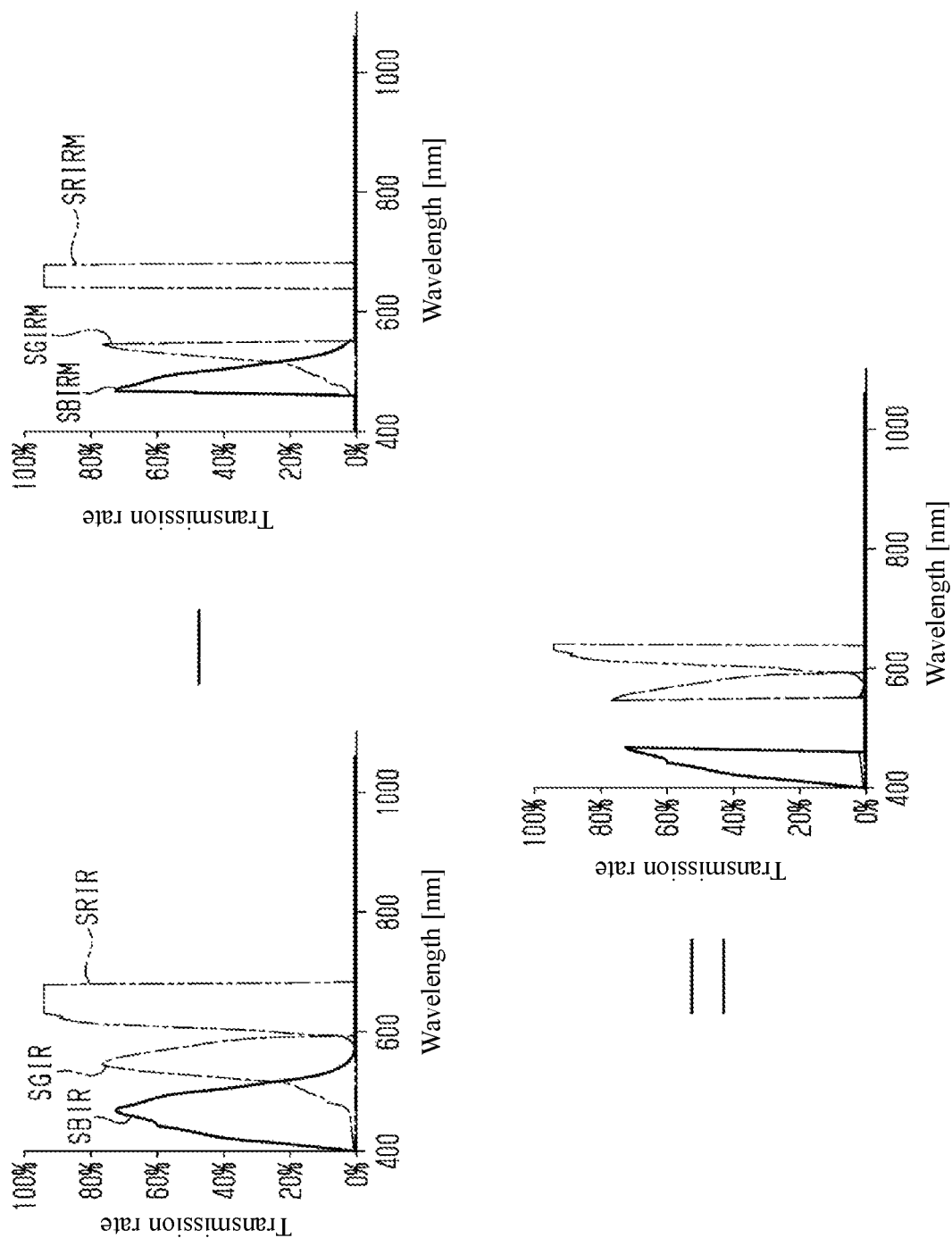
FIG. 16 is a curve diagram of spectral sensitivity curves of an example of a processed result of a processor of an optical sensor.

Digital signals of the plurality of signal detection light receiving portions R1, G1 and B1, for example, are inputted from the light receiving portion 11 to the processor 14. Thus, a digital signal Sr1 based on the spectral sensitivity curve SRIR, a digital signal Sg1 based on the spectral sensitivity curve SGIR, a digital signal Sb1 based on the spectral sensitivity curve SBIR, a digital signal Sr2 based on the spectral sensitivity curve SRIRM, a digital signal Sg2 based on the spectral sensitivity curve SGIRM, and a digital signal Sb2 based on the spectral sensitivity curve SBIRM shown in FIG. 16 are individually inputted to the processor 14. Further, a digital signal Sr3 of the infrared light receiving portion R2 having the multi-layer filter 16 in the red light receiving portion 11R is inputted from the light receiving portion 11 to the processor 14. These digital signals Sr1, Sr2, Sg1, Sg2, Sb1 and Sb2 are respective examples of a plurality of output signals obtained from photocurrents that flow as a result of light received by the plurality of optical receivers 42.

As shown in FIG. 16, the processor 14 may use the spectral sensitivity curve SRIR and the spectral sensitivity curve SRIRM to calculate a spectral sensitivity curve different from the spectral sensitivity curve SRIRM. More specifically, the spectral sensitivity curve SRIRM is removed from the spectral sensitivity curve SRIR to obtain the remaining spectral sensitivity curve other than the spectral sensitivity curve SRIRM from the spectral sensitivity curve SRIR. That is, from the red wavelength band, the wavelength band outside the second transmission wavelength region P2 of the spectral sensitivity curve SM is obtained as the spectral sensitivity curve of the transmission wavelength region.

Further, the processor 14 may use the spectral sensitivity curve SGIR and the spectral sensitivity curve SGIRM to calculate a spectral sensitivity curve different from the spectral sensitivity curve SGIRM. More specifically, the spectral sensitivity curve SGIRM is removed from the spectral sensitivity curve SGIR to obtain the remaining spectral sensitivity curve other than the spectral sensitivity curve SGIRM from the spectral sensitivity curve SGIR. That is, from the green wavelength band, the wavelength band outside the first transmission wavelength region P1 of the spectral sensitivity curve SM is obtained as the spectral sensitivity curve of the transmission wavelength region.

Further, the processor 14 may use the spectral sensitivity curve SBIR and the spectral sensitivity curve SBIRM to calculate a spectral sensitivity curve different from the spectral sensitivity curve SBIRM. More specifically, the spectral sensitivity curve SBIRM is removed from the spectral sensitivity curve SBIR to obtain the remaining spectral sensitivity curve other than the spectral sensitivity curve SBIRM from the spectral sensitivity curve SBIR. That is, from the blue wavelength band, the wavelength band outside the first transmission wavelength region P1 of the spectral sensitivity curve SM is obtained as the spectral sensitivity curve of the transmission wavelength region.

In this case, the processor 14 calculates the intensity of light of the red wavelength band shown in FIG. 16 by means of a difference (Sr1-Sr2) between the digital signal Sr1 and the digital signal Sr2, calculates the intensity of light of the green wavelength band shown in FIG. 16 by means of a difference (Sg1-Sg2) between the digital signal Sg1 and the digital signal Sg2, and calculates the intensity of light of the blue wavelength band shown in FIG. 16 by means of a difference (Sb1-Sb2) between the digital signal Sb1 and the digital signal Sb2. As such, each of the red wavelength band, the green wavelength band and the blue wavelength band can be processed and divided into two parts to obtain the intensity of light in the wavelength band.

As described above, in this embodiment, the processor 14 can obtain the digital signals in the seven transmission wavelength regions shown in FIG. 17. More specifically, as shown in FIG. 17, the seven transmission wavelength regions include a first wavelength band to a seventh wavelength band. A lower half-wave width limit Fcl of the first wavelength band is 470 nm, an upper half-wave width limit Fch is 515 nm, and the center wavelength is 492.5 nm. A lower half-wave width limit Fcl of the second wavelength band is 515 nm, an upper half-wave width limit Fch is 555 nm, and the center wavelength is 535 nm. A lower half-wave width limit Fcl of the third wavelength band is 660 nm, an upper half-wave width limit Fch is 700 nm, and the center wavelength is 680 nm. A lower half-wave width limit Fcl of the fourth wavelength band is 420 nm, an upper half-wave width limit Fch is 470 nm, and the center wavelength is 445 nm. A lower half-wave width limit Fcl of the fifth wavelength band is 555 nm, an upper half-wave width limit Fch is 595 nm, and the center wavelength is 575 nm. A lower half-wave width limit Fcl of the sixth wavelength band is 620 nm, an upper half-wave width limit Fch is 660 nm, and the center wavelength is 640 nm. As such, the first wavelength band to the sixth wavelength band include the visible light band and the visible light band is divided into six parts. The first wavelength band to the sixth wavelength band are substantially 40 nm wavelength bands, respectively. Further, a lower half-wave width limit Fcl of the seventh wavelength band is 825 nm, an upper half-wave width limit Fch is 910 nm, and the center wavelength is 867.5 nm.

The processor 14 calculates the intensity of visible light according to the digital signals in the first wavelength band to the sixth wavelength band. Further, the processor 14 calculates the intensity of infrared light according to the digital signal in the seventh wavelength band.

(Effects)

The effects of the optical sensor 1 of this embodiment are described below.

The optical sensor 1 allows transmission of light of the first wavelength band to the third wavelength band by the layered multi-layer filter 16 and color filter 60 in the individual signal detection light receiving portions R1, G1 and B1. That is, the optical sensor 1 can detect light of the first wavelength band to the third wavelength band. Moreover, the processor 14 can detect light of the fourth wavelength band to the sixth wavelength band according to the wavelength band and the first wavelength band to the third wavelength band capable of transmitting through the color filter 60. That is, in a wavelength band obtained by dividing each of the red, green and blue wavelength bands into two parts, the optical sensor 1 can detect light of that wavelength band.

Further, the optical sensor 1 allows transmission of light of the seventh wavelength band by the layered multi-layer filter 16 and color filter 60 (the layered structure of the red color filter 61R and the blue color filter 61B) in the infrared light receiving portion R2. Further, in the wavelength band of the transmitted infrared light, the processor 14 can detect light of a wavelength band outside the seventh wavelength band according to the spectral sensitivity curve of the infrared light receiving portion R2 excluding the multi-layer filter 16 and the spectral sensitivity curve of the infrared light receiving portion R2 including the multi-layer filter 16. That is, the optical sensor 1 can detect, in the wavelength band of the transmitted infrared light, light of the seventh wavelength band and the wavelength band outside the seventh wavelength band.

(Results)

The following results can be obtained according to the optical sensor 1 of this embodiment.

(1) The optical sensor 1 includes the multi-layer filter 16 layered on the plurality of color filters 60. The multi-layer filter 16 allows transmission of light of a portion of the wavelength band in the visible light band transmitting through the color filters 60. According to the configuration, in the layered structure of the multi-layer filter 16 and the color filter 60, light of the portion of the wavelength can be detected, and in a situation where the visible light band can be detected by the color filter 60, light of the remaining wavelength band can be detected by means of removing light of the portion of the wavelength band. As such, the visible light band to be detected can be subdivided, thereby enhancing spectral characteristics.

(2) The multi-layer filter 16 includes: the first transmission wavelength region P1 allowing transmission of a portion of light of the green wavelength band and a portion of light of the blue wavelength band; and the second transmission wavelength region P2 allowing transmission of a portion of the red wavelength band. According to the configuration, by using the layered color filter 60 and the multi-layer filter 16, the green wavelength band and the blue wavelength band can be subdivided by means of the first transmission wavelength region P1, and the red wavelength band can be subdivided by means of the second transmission wavelength region P2. That is, the wavelength band to be detected in the visible light band can be subdivided. Therefore, spectral characteristics of each of the red wavelength band, the green wavelength band and the blue wavelength band can be enhanced.

(3) The multi-layer filter 16 allows transmission of visible light of adjacent wavelength bands of individual color filters 60 among the wavelength bands of the color filters 60. According to the configuration, even if the spectral sensitivity curve SM of the multi-layer filter 16 is not subdivided, the visible light band to be detected with respect to the wavelength band of each of the plurality of color filters 60 can still be subdivided.

(4) The multi-layer filter 16 has the third transmission wavelength region P3 allowing transmission of a portion of the infrared band. According to the configuration, the wavelength band to be detected in the infrared band can be subdivided by the layered color filter 60 and multi-layer filer 16. Therefore, spectral characteristics of the infrared band can be enhanced.

(5) The multi-layer filter 16 includes a layered structure made of $SiO_2$ and $TiO_2$. According to the configuration, the spectral sensitivity curve SM of the multi-layer filter 16 can be changed by modifying the respective thicknesses and the numbers of layers of the layered structure made of $SiO_2$ and $TiO_2$. Thus, the wavelength band allowing transmission of light can be set as desired in the multi-layer filter 16 for at least one of visible light and infrared light.

(6) The multi-layer filter 16 includes: the first transmission wavelength region P1, allowing transmission of a portion of the blue wavelength band; and the first light shielding wavelength region Q1, cutting off light of a wavelength band on the wavelength side shorter than the first transmission wavelength region P1. The first minimum wavelength P1min of the first transmission wavelength region P1 is set, in the blue wavelength band, on the wavelength side longer than the minimum wavelength, and the first maximum wavelength P1max is set, in the blue wavelength band, on the wavelength side longer than the maximum wavelength. According to the configuration, the first light shielding wavelength region Q1 cuts off, in the blue wavelength band, light outside the first transmission wavelength region P1. Thus, the blue wavelength band can be divided into two parts by means of the first transmission wavelength region P1 and the first light shielding wavelength region Q1. Hence, the optical sensor 1 can detect both light of the first transmission wavelength region P1 in the blue wavelength band, and light outside the first transmission wavelength region P1 (the wavelength band lower than the first transmission wavelength region P1 in the blue wavelength band) in the blue wavelength band. Thus, the blue wavelength band to be detected can be subdivided, thereby enhancing spectral characteristics of the blue wavelength band.

(7) The multi-layer filter 16 includes: the first transmission wavelength region P1, allowing transmission of a portion of the green wavelength band; and the second light shielding wavelength region Q2, cutting off light of a wavelength band on the wavelength side longer than the first transmission wavelength region P1. The first minimum wavelength P1min of the first transmission wavelength region P1 is set, in the green wavelength band, on the wavelength side shorter than the minimum wavelength, and the first maximum wavelength P1max is set, in the green wavelength band, on the wavelength side longer than the minimum wavelength. According to the configuration, the second light shielding wavelength region Q2 cuts off, in the green wavelength band, light outside the first transmission wavelength region P1. Thus, the green wavelength band can be divided into two parts by means of the first transmission wavelength region P1 and the second light shielding wavelength region Q2. Hence, the optical sensor 1 can detect both light of the first transmission wavelength region P1 in the green wavelength band, and light outside the first transmission wavelength region P1 (the wavelength band on the wavelength side longer than the first transmission wavelength region P1 in the green wavelength band) in the green wavelength band. Thus, the green wavelength band to be detected can be subdivided, thereby enhancing spectral characteristics of the green wavelength band.

(8) The multi-layer filter 16 includes: the second transmission wavelength region P2, allowing transmission of a portion of the red wavelength band; and the second light shielding wavelength region Q2, cutting off light of a wavelength band on the wavelength side shorter than the second transmission wavelength region P2. That is, the second light shielding wavelength region Q2 cuts off light between the first transmission wavelength region P1 and the second transmission wavelength region P2. The second minimum wavelength P2min of the second transmission wavelength region P2 is set, in the red wavelength band, on the wavelength side longer than the minimum wavelength, and the second maximum wavelength P2max is set, in the red wavelength band, on the wavelength side longer than the maximum wavelength. According to the configuration, the second light shielding wavelength region Q2 cuts off, in the green wavelength band, light outside the second transmission wavelength region P2. Thus, the red wavelength band can be divided into two parts by means of the second transmission wavelength region P2 and the second light shielding wavelength region Q2. Hence, the optical sensor 1 can detect both light of the second transmission wavelength region P2 in the red wavelength band, and light outside the second transmission wavelength region P2 (the wavelength band on the wavelength side shorter than the second transmission wavelength region P2 in the red wavelength band) in the red wavelength band. Thus, the red wavelength band to be detected can be subdivided, thereby enhancing spectral characteristics of the red wavelength band.

(9) The first transmission wavelength region P1 overlaps both a portion of the blue wavelength band and a portion of the green wavelength band. According to the configuration, the spectral sensitivity curve of the multi-layer filter 16 can be applied to respective wavelength bands for blue color and green color. Hence, without increasing the types of the multi-layer filter 16, the visible light to be detected in the blue wavelength band and the green wavelength band can be subdivided.

(10) The multi-layer filter 16 includes: the third transmission wavelength region P3, allowing transmission of a portion of the infrared band; the third light shielding wavelength region Q3, cutting off light of a wavelength band on the wavelength side shorter than the third transmission wavelength region P3; and the fourth light shielding wavelength region Q4, cutting off light of a wavelength band on the wavelength side longer than the third transmission wavelength region P3. That is, the third light shielding wavelength region Q3 cuts off light between the second transmission wavelength region P2 and the third transmission wavelength region P3. According to the configuration, the third light shielding wavelength region Q3 and the fourth light shielding wavelength region Q4 cut off, in the infrared band, light outside the third transmission wavelength region P3. Hence, the optical sensor 1 can detect both light of the third transmission wavelength region P3 in the infrared band, and light outside the third transmission wavelength region P3 (the wavelength band on the wavelength side shorter than the third transmission wavelength region P3 in the infrared band and the wavelength band on the wavelength side longer than the third transmission wavelength region P3 in the infrared band) in the infrared band. Thus, the infrared band to be detected can be subdivided, thereby enhancing spectral characteristics of the infrared band.

(11) The signal detection light receiving portion R1 of the red light receiving portion 11R is provided with the plurality of optical receivers 42, one optical receiver 42 among the plurality of optical receivers 42 is covered by the layered structure of the red color filter 61R and the multi-layer filter 16, and another optical receiver 42 is covered by the red color filter 61R. That is, the another optical receiver 42 is not covered by the multi-layer filter 16. According to the configuration, the processor 14 can calculate, according to the difference between the photocurrent of one optical receiver 42 and the photocurrent of the another optical receiver 42 among the plurality of optical receivers 42 of the signal detection light receiving portion R1, the intensity of light, in the red wavelength band, of the wavelength band cut off by the multi-layer filter 16. Thus, the red wavelength band to be detected can be subdivided, thereby enhancing spectral characteristics of the red wavelength band.

(12) The signal detection light receiving portion G1 of the green light receiving portion 11G is provided with the plurality of optical receivers 42, one optical receiver 42 among the plurality of optical receivers 42 is covered by the layered structure of the green color filter 61G and the multi-layer filter 16, and another optical receiver 42 is covered by the green color filter 61G. That is, the another optical receiver 42 is not covered by the multi-layer filter 16.

According to the configuration, the processor 14 can calculate, according to the difference between the photocurrent of one optical receiver 42 and the photocurrent of the another optical receiver 42 among the plurality of optical receivers 42 of the signal detection light receiving portion G1, the intensity of light, in the green wavelength band, of the wavelength band cut off by the multi-layer filter 16. Thus, the green wavelength band to be detected can be subdivided, thereby enhancing spectral characteristics of the green wavelength band.

(13) The signal detection light receiving portion B1 of the blue light receiving portion 11B is provided with the plurality of optical receivers 42, one optical receiver 42 among the plurality of optical receivers 42 is covered by the layered structure of the blue color filter 61B and the multi-layer filter 16, and another optical receiver 42 is covered by the blue color filter 61B. That is, the another optical receiver 42 is not covered by the multi-layer filter 16. According to the configuration, the processor 14 can calculate, according to the difference between the photocurrent of one optical receiver 42 and the photocurrent of the another optical receiver 42 among the plurality of optical receivers 42 of the signal detection light receiving portion B1, the intensity of light, in the blue wavelength band, of the wavelength band cut off by the multi-layer filter 16. Thus, the blue wavelength band to be detected can be subdivided, thereby enhancing spectral characteristics of the blue wavelength band.

(14) The multi-layer filter 16 of the signal detection light receiving portion B1 of the blue light receiving portion 11B and the multi-layer filter 16 of the signal detection light receiving portion G1 of the green light receiving portion 11G are implemented by a common multi-layer filter. According to the configuration, the types of the multi-layer filter can be suppressed from increasing. Particularly, in this embodiment, the signal detection light receiving portions R1, G1 and B1 and the multi-layer filter 16 of the infrared light receiving portion R2 are implemented by a common multi-layer filter. According to the configuration formed by one type of multi-layer filter 16, the types of the multi-layer filter can be suppressed from increasing.

(15) When observed in the z direction, the signal detection light receiving portion B1 of the blue light receiving portion 11B is arranged adjacent to the signal detection light receiving portion G1 of the green light receiving portion 11G. According to the configuration, it is easy to implement the multi-layer filter 16 as a common multi-layer filter.

(16) The optical sensor 1 further includes the infrared cutoff filter 12. According to the configuration, light of the wavelength band of infrared light (the wavelength band of above approximately 800 nm) can be cut off by the infrared cutoff filter 12, thereby achieving detection of visible light with high precision.

(Electronic Apparatus Mounted with the Optical Sensor 1)

Figure 18:
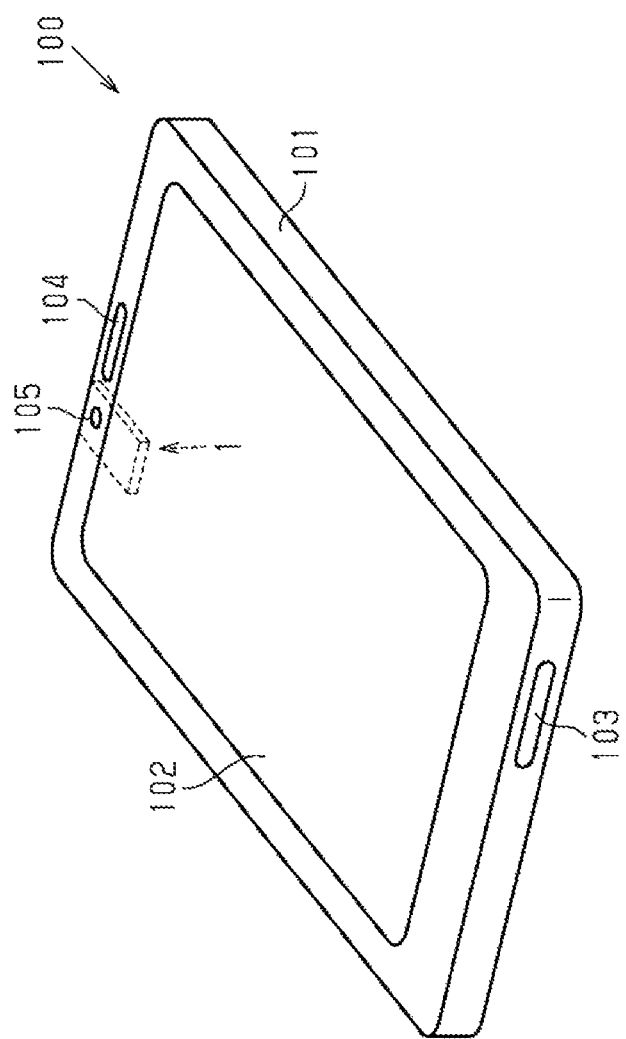
FIG. 18 is a three-dimensional diagram of a smart phone, as an example of an electronic apparatus.

The optical sensor 1 of the embodiment can be mounted in an electronic apparatus such as a smart phone, a mobile phone, a tablet personal computer (PC), a laptop PC, a digital camera, a vehicle navigation device and a television. FIG. 18 shows a three-dimensional diagram of the appearance of a smart phone 100, as an example of an electronic apparatus.

The smart phone 100 is a structure in which electronic components are accommodated in a frame 101 shaped as a flat rectangle plate. The frame 101 has rectangular obverse surface and reverse surface, and the obverse surface and the reverse surface are connected by four side surfaces. A display surface of a display panel 102 formed by such as a liquid crystal panel or an organic electroluminescent (EL) panel is exposed on the obverse surface of the frame 101. The display surface of the display panel 102 forms a touch panel, and provides a user with an input interface.

A microphone 103 is provided on one side surface of the four side surfaces of the frame 101. The microphone 103 provides a voice transmitter for a phone function, and can also serve as a microphone for recording. Between the pair of widthwise sides of the display panel 102, a speaker 104 is provided near the widthwise side opposite to the widthwise side near the microphone 103. The speaker 104 provides a voice receiver for a phone function, and can also serve as a sounding unit for playing such as music data. A lens window 105 is provided adjacent to the speaker 104. In the frame 101, the optical sensor 1 is provided on a position opposite to the lens window 105.

As such, the smart phone 100 includes the optical sensor 1 capable of ideally reducing the sensitivity of the wavelength band of infrared light, and can be used in actual applications even if the transmission rate of visible light of the lens window 105 for receiving light in the smart phone 100 is low. Thus, the degree of design freedom of the lens window 105 can be increased (for changing such as the color and shape).

Variation Example

The embodiment is an example of implementation forms of the optical sensor and the electronic apparatus related to the present disclosure, and is not to be construed as limiting the forms of the present disclosure. The optical sensor and the electronic apparatus related to the present disclosure can be implemented in forms different from the exemplary forms in the embodiment described above. An example thereof is obtained by replacing, changing, or omitting a part of the configuration of the embodiment, or a form obtained by adding a new configuration to the embodiment. Moreover, given that no technical contradiction is resulted, the following variation examples may be used in combination. In the variation examples below, parts that are common with the embodiment described above are denoted by the same numerals and symbols, and the related description is omitted.

At least one of the conversion portion 13 and the processor 14 may be omitted. When the processor 14 is omitted, an analog signal, i.e., a photocurrent, of the light receiving portion 11 is converted by the conversion portion 13 of the optical sensor 1 to a digital signal and outputted to an external control device. When the conversion portion 13 and the processor 14 are omitted, the optical sensor 1 outputs the photocurrent of the light receiving portion 11 in a form of an analog signal to the external control device.

In the embodiment, the multi-layer filter 16 is individually provided, for example but not limited to, at the signal detection light receiving portions R1, G1 and B1 and the infrared light receiving portion B2.

For example, the multi-layer filter 16 may be omitted from the signal detection light receiving portion R1. In this case, the signal detection light receiving portion R1 receives light of the red wavelength band (above approximately 600 nm and below approximately 750 nm).

For example, the multi-layer filter 16 may be omitted from the signal detection light receiving portion G1. In this case, the signal detection light receiving portion R1 receives light of the green wavelength band (above approximately 500 nm and below approximately 610 nm).

For example, the multi-layer filter 16 may be omitted from the signal detection light receiving portion B1. In this case, the signal detection light receiving portion B1 receives light of the blue wavelength band (above approximately 400 nm and below approximately 570 nm).

For example, the multi-layer filter 16 may be individually omitted from the signal detection light receiving portions R1 and G1. In this case, the multi-layer filter 16 is individually provided at the signal detection light receiving portion B1 and the infrared light receiving portion B2.

For example, the multi-layer filter 16 may be individually omitted from the signal detection light receiving portions R1 and B1. In this case, the multi-layer filter 16 is individually provided at the signal detection light receiving portion G1 and the infrared light receiving portion B2.

For example, the multi-layer filter 16 may be individually omitted from the signal detection light receiving portions G1 and B1. In this case, the multi-layer filter 16 is individually provided at the signal detection light receiving portion R1 and the infrared light receiving portion B2.

For example, the multi-layer filter 16 may be individually omitted from the signal detection light receiving portions R1, G1 and B1. In this case, the multi-layer filter 16 is individually provided at the infrared light receiving portion B2.

For example, the multi-layer filter 16 may be individually omitted from the signal detection light receiving portion R1 and the infrared light receiving portion B2. In this case, the multi-layer filter 16 is individually provided at the signal detection light receiving portions G1 and B1.

For example, the multi-layer filter 16 may be individually omitted from the signal detection light receiving portion G1 and the infrared light receiving portion B2. In this case, the multi-layer filter 16 is individually provided at the signal detection light receiving portions R1 and B1.

For example, the multi-layer filter 16 may be individually omitted from the signal detection light receiving portion B1 and the infrared light receiving portion B2. In this case, the multi-layer filter 16 is individually provided at the signal detection light receiving portions R1 and G1.

For example, the multi-layer filter 16 may be omitted from the signal detection light receiving portions R1 and G1 and the infrared light receiving portion B2. In this case, the multi-layer filter 16 is provided at the signal detection light receiving portion B1.

For example, the multi-layer filter 16 may be individually omitted from the signal detection light receiving portions R1 and B1 and the infrared light receiving portion B2. In this case, the multi-layer filter 16 is provided at the signal detection light receiving portion G1.

For example, the multi-layer filter 16 may be individually omitted from the signal detection light receiving portions G1 and B1 and the infrared light receiving portion B2. In this case, the multi-layer filter 16 is provided at the signal detection light receiving portion R1.

In the embodiment, the configuration position of the multi-layer filter 16 can be changed as desired. In one example, the multi-layer filter 16 may be provided in at least one of the infrared light receiving portion R2 and the infrared light receiving portion R3. That is, the multi-layer filter 16 may be provided on the red color filter 61R of at least one of the infrared light receiving portions R2 and R3. Further, the multi-layer filter 16 is individually provided at the infrared light receiving portion G2. That is, the multi-layer filter 16 may be provided on the red color filter 61R of the infrared light receiving portion G2.

In the embodiment, the numbers of the signal detection light receiving portions R1, G1 and B1 and the infrared light receiving portions R2, R3, G2 and B2 can be modified as desired. For example, the numbers of the signal detection light receiving portions R1, G1 and B1 and the infrared light receiving portions R2, R3, G2 and B2 can be more than three, respectively. In this case, a plurality of optical receivers 42 (the first optical receivers) among the plurality of optical receivers 42 of the signal detection light receiving portion R1 are covered by the layered structure of the red color filter 61R and the multi-layer filter 16, and the plurality of the remaining optical receivers 42 among the plurality of optical receivers 42 of the signal detection light receiving portion R1 can also be covered by the red color filter 61R. A plurality of optical receivers 42 (the second optical receivers) among the plurality of optical receivers 42 of the signal detection light receiving portion G1 are covered by the layered structure of the green color filter 61G and the multi-layer filter 16, and the plurality of the remaining optical receivers 42 among the plurality of optical receivers 42 of the signal detection light receiving portion G1 can also be covered by the green color filter 61G. A plurality of optical receivers 42 (the third optical receivers) among the plurality of optical receivers 42 of the signal detection light receiving portion B1 are covered by the layered structure of the blue color filter 61B and the multi-layer filter 16, and the plurality of the remaining optical receivers 42 among the plurality of optical receivers 42 of the signal detection light receiving portion B1 can also be covered by the blue color filter 61B.

The configuration of the light receiving portion 11 is not limited to the configuration of the light receiving portion 11 of the embodiment, and can be modified as desired. In one example, the light receiving portion 11 may further include a yellow light receiving portion. The yellow light receiving portion, same as the red light receiving portion 11R, includes a signal detection light receiving portion and an infrared light receiving portion.

In the light receiving portion 11, the configuration form of the signal detection light receiving portions R1, G1 and B1 and the infrared light receiving portions R2, R3, B2 and G2 observed in the z direction is not limited to the configuration form of the embodiment, and can be modified as desired.

Either of the infrared light receiving portions R2 and R3 may be omitted.

The infrared light receiving portions R2, R3, G2 and B2 may be omitted.

The signal detection light receiving portions R1, G1 and B1 may be omitted.

The wavelength band of the multi-layer filter 16 allowing transmission of light can be changed as desired. In one example, the first transmission wavelength region P1 may be a wavelength band excluding the center wavelength FBc of the transmission wavelength region (the blue wavelength band) of the spectral sensitivity curve SBIR. That is, the first minimum wavelength P1min of the first transmission wavelength region P1 may be a wavelength on the wavelength side longer than the center wavelength FBc of the transmission wavelength region of the spectral sensitivity curve SBIR. Further, the first transmission wavelength region P1 may be a wavelength band excluding the transmission wavelength region of the spectral sensitivity curve SBIR. That is, the first minimum wavelength P1min of the first transmission wavelength region P1 may be set to be on the wavelength side longer than the maximum wavelength FBch of the transmission wavelength region of the spectral sensitivity curve SBIR. Further, the first transmission wavelength region P1 may be a wavelength band excluding the center wavelength FGc of the transmission wavelength region (the green wavelength band) of the spectral sensitivity curve SGIR. That is, the first maximum wavelength P1max of the first transmission wavelength region P1 may be a wavelength on the wavelength side shorter than the center wavelength FGc of the transmission wavelength region of the spectral sensitivity curve SGIR. Further, the first transmission wavelength region P1 may be a wavelength band excluding the transmission wavelength region of the spectral sensitivity curve SGIR. That is, the first maximum wavelength P1max of the first transmission wavelength region P1 may be set to be on the wavelength side shorter than the minimum wavelength FGcl of the transmission wavelength region of the spectral sensitivity curve SGIR.

Moreover, the multi-layer filter 16 may also be configured such that the second transmission wavelength region P2 allows transmission of a portion of the wavelength band of each of the red wavelength band and the green wavelength band, and cuts off the remaining wavelength band of each of the red wavelength band and the green wavelength band. In this case, the second transmission wavelength region P2 may include a portion of the transmission wavelength region of the spectral sensitivity curve SGIR. In this case, the multi-layer filter 16 is configured such that the first transmission wavelength region P1 excludes a portion of the transmission wavelength region of the spectral sensitivity curve SGIR.

Further, the third minimum wavelength P3min and the third maximum wavelength P3max of the third transmission wavelength region P3 may be modified as desired. The third minimum wavelength P3min of the third transmission wavelength region P3 can be set on the wavelength side longer than the second maximum wavelength P2max of the second transmission wavelength region P2.

In the embodiment, the spectral sensitivity curve SM of the multi-layer filter 16 has, for example but not limited to, the first transmission wavelength region P1, the second transmission wavelength region P2 and the third transmission wavelength region P3.

Figure 19:
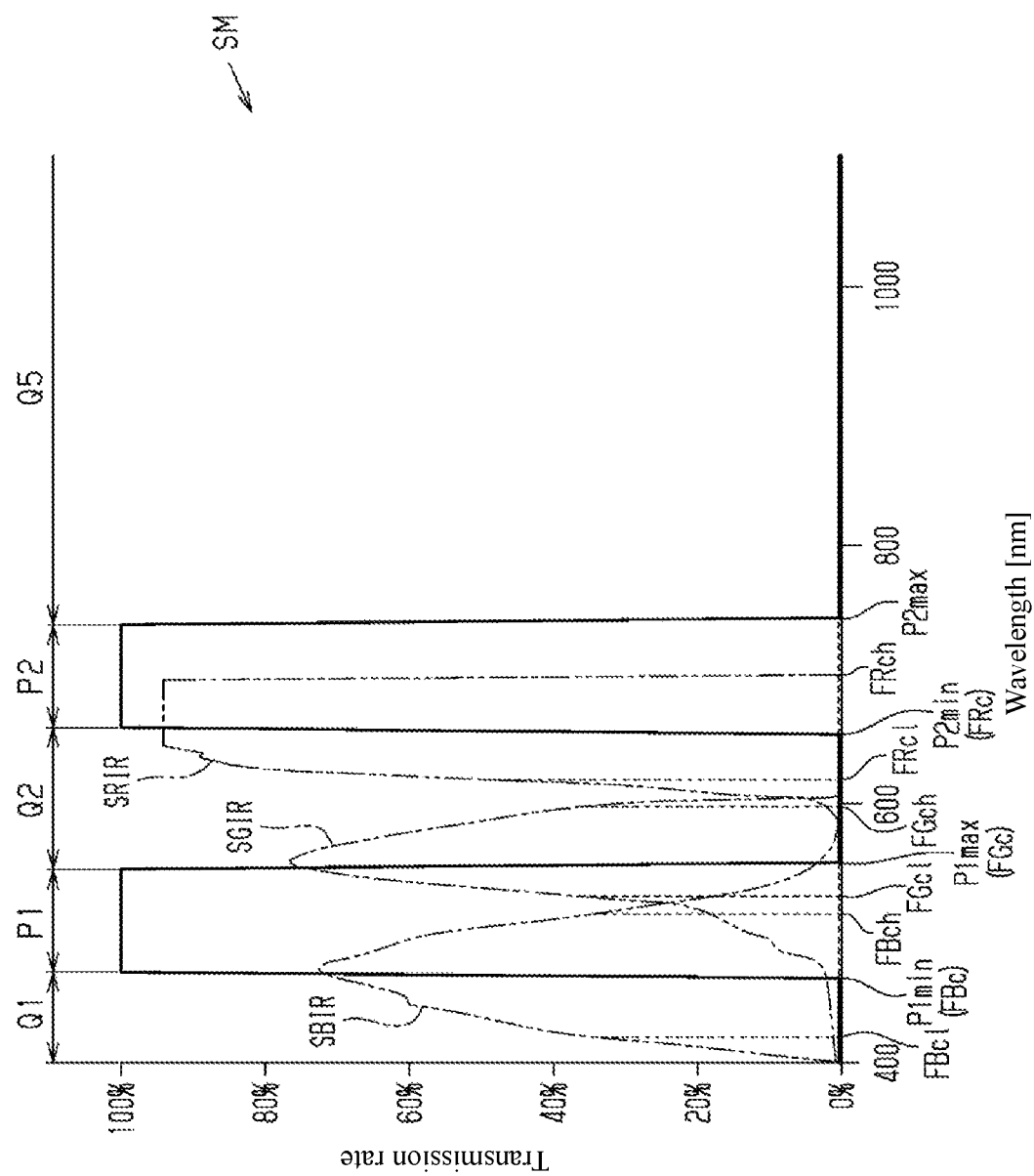
FIG. 19 is a curve diagram of spectral sensitivity curves of a multi-layer filter according to a variation example.

As shown in FIG. 19, the spectral sensitivity curve SM may have the first transmission wavelength region P1 and the second transmission wavelength region P2 but does not have the third transmission wavelength region P3. That is, the multi-layer filter 16 is configured to subdivide only visible light into a plurality of specific wavelength bands. In this case, the spectral sensitivity curve SM has a light shielding wavelength region Q5 for replacing the third light shielding wavelength region Q3 and the fourth light shielding wavelength region Q4, wherein the light shielding wavelength region Q5 cuts off light on the wavelength side longer than the second maximum wavelength P2max in the second transmission wavelength region P2. Further, in this case, the multi-layer filter 16 of the infrared light receiving portion R2 may be omitted. Further, in this case, similar to the variation example above, the first transmission wavelength region P1 and the second transmission wavelength region P2 can change the minimum wavelength and the maximum wavelength in the transmission wavelength region as desired.

For example, although not shown, the spectral sensitivity curve SM may have the first transmission wavelength region P1 and the third transmission wavelength region P3 but does not have the second transmission wavelength region P2. In this case, the spectral sensitivity curve SM has a light shielding wavelength region for cutting off light between the first transmission wavelength region P1 and the third transmission wavelength region P3 and for replacing the second light shielding wavelength region Q2 and the third light shielding wavelength region Q3. Further, in this case, the multi-layer filter 16 of the signal detection light receiving portion R1 may be omitted. Further, in this case, either of the blue color filter 61B and the green color filter 61G corresponds to the first filter allowing transmission of light of the first visible light band, and the red color filter 61R corresponds to the second filter allowing transmission of light of the second visible light band. Moreover, the first transmission wavelength region P1 corresponds to a first transmission wavelength region allowing transmission a portion of light of the first visible light band, and the third transmission wavelength region P3 corresponds to a second transmission wavelength region allowing transmission of a portion of light of the infrared band. Further, similar to the variation example above, the first transmission wavelength region P1 and the third transmission wavelength region P3 can change the minimum wavelength and the maximum wavelength in the transmission wavelength region as desired.

For example, although not shown, the spectral sensitivity curve SM may have the second transmission wavelength region P2 and the third transmission wavelength region P3 but does not have the first transmission wavelength region P1. In this case, the spectral sensitivity curve SM has a light shielding wavelength region for cutting off light on the wavelength side shorter than the second transmission wavelength region P2 and for replacing the first light shielding wavelength region Q1 and the second light shielding wavelength region Q2. Further, in this case, the multi-layer filter 16 of at least one of the signal detection light receiving portions G1 and B1 may be omitted. Further, similar to the variation example above, the second transmission wavelength region P2 and the third transmission wavelength region P3 can change the minimum wavelength and the maximum wavelength in the transmission wavelength region as desired.

In the embodiment, the multi-layer filter 16 has, for example but not limited to, a plurality of transmission wavelength regions. The multi-layer filter 16 may also have one single transmission wavelength region.

For example, although not shown, the spectral sensitivity curve SM of the multi-layer filter 16 may have the first transmission wavelength region P1 but does not have the second transmission wavelength region P2 and the third transmission wavelength region P3. In this case, the spectral sensitivity curve SM has a light shielding wavelength region for cutting off light on the wavelength side longer than the first transmission wavelength region P1 and for replacing the second to fourth light shielding wavelength regions Q2-Q4. Further, in this case, the multi-layer filter 16 of at least one of the signal detection light receiving portion R1 and the infrared light receiving portions G2, B2, R2 and R3 may be omitted. Further, similar to the variation example above, the first transmission wavelength region P1 can change the minimum wavelength and the maximum wavelength in the transmission wavelength region as desired.

For example, although not shown, the spectral sensitivity curve SM may have the second transmission wavelength region P2 but does not have the first transmission wavelength region P1 and the third transmission wavelength region P3. In this case, the spectral sensitivity curve SM has a light shielding wavelength region for cutting off light on the wavelength side shorter than the second transmission wavelength region P2 and for replacing the first light shielding wavelength region Q1 and the second light shielding wavelength region Q2, and the spectral sensitivity curve SM has a light shielding wavelength region for cutting off light on the wavelength side longer than the second transmission wavelength region P2 and for replacing the third light shielding wavelength region Q3 and the fourth light shielding wavelength region Q4. Further, in this case, the multi-layer filter 16 of at least one of the signal detection light receiving portions G1 and B1 and the infrared light receiving portions G2, B2, R2 and R3 may be omitted. Further, similar to the variation example above, the third transmission wavelength region P3 can change the minimum wavelength and the maximum wavelength in the transmission wavelength region as desired. As such, the multi-layer filter 16 can only have a transmission wavelength region allowing transmission of a portion of light of the visible light band, and a light shielding wavelength region cutting off light of the visible light band outside light of the transmission wavelength region.

For example, although not shown, the spectral sensitivity curve SM may have the third transmission wavelength region P3 but does not have the first transmission wavelength region P1 and the second transmission wavelength region P2. In this case, the spectral sensitivity curve SM has a light shielding wavelength region for cutting off light on the wavelength side shorter than the third transmission wavelength region P3 and for replacing the first to third light shielding wavelength regions Q1-Q3. Further, in this case, the multi-layer filter 16 of at least one of the signal detection light receiving portions R1, G1 and B1 may be omitted. Further, similar to the variation example above, the third transmission wavelength region P3 can change the minimum wavelength and the maximum wavelength in the transmission wavelength region as desired.

In the embodiment, the multi-layer filter 16 is provided; the multi-layer filter 16 has, for example but not limited to, the common spectral sensitivity curve SM at the signal detection light receiving portions R1, G1 and B1 and the infrared light receiving portion B2. For example, the multi-layer filter 16 below may be provided; the multi-layer filter 16 has different spectral sensitivity curves at the signal detection light receiving portions R1, G1 and B1 and the infrared light receiving portion B2. For example, the multi-layer filter 16 of the signal detection light receiving portion R1 has the spectral sensitivity curve below; the spectral sensitivity curve has the second transmission wavelength region P2 but does not have the first transmission wavelength region P1 and the third transmission wavelength region P3. The multi-layer filter 16 of each of the signal detection light receiving portions G1 and B1 has the spectral sensitivity curve below; the spectral sensitivity curve has the first transmission wavelength region P1 but does not have the second transmission wavelength region P2 and the third transmission wavelength region P3. The multi-layer filter 16 of the infrared light receiving portion R2 has the spectral sensitivity curve below; the spectral sensitivity curve has the third transmission wavelength region P3 but does not have the first transmission wavelength region P1 and the second transmission wavelength region P2. As such, a multi-layer filter 16 having the spectral sensitivity curve below can be provided; the spectral sensitivity curve is suitable as the spectral sensitivity curve of each of the signal detection light receiving portions R1, G1 and B1 and the infrared light receiving portion B2.

In the embodiment, the spectral sensitivity curve SM is set to have, for example but not limited to, a single transmission wavelength region, at the transmission wavelength region of the spectral sensitivity curves SBIR, SGIR and SRIR. For example, the spectral sensitivity curve SM may be set to have a plurality of transmission wavelength regions at the transmission wavelength region of the spectral sensitivity curve SBIR. Further, the spectral sensitivity curve SM may be set to have a plurality of transmission wavelength regions at the transmission wavelength region of the spectral sensitivity curve SGIR. Further, the spectral sensitivity curve SM may be set to have a plurality of transmission wavelength regions at the transmission wavelength region of the spectral sensitivity curve SRIR.

In the embodiment, the spectral sensitivity curve SM is set to have, for example but not limited to, a single transmission wavelength region (the third transmission wavelength region P3), at the wavelength band of infrared light. For example, the spectral sensitivity curve SM may also be set to have a plurality of transmission wavelength regions at the wavelength band of infrared light.

Figure 20:
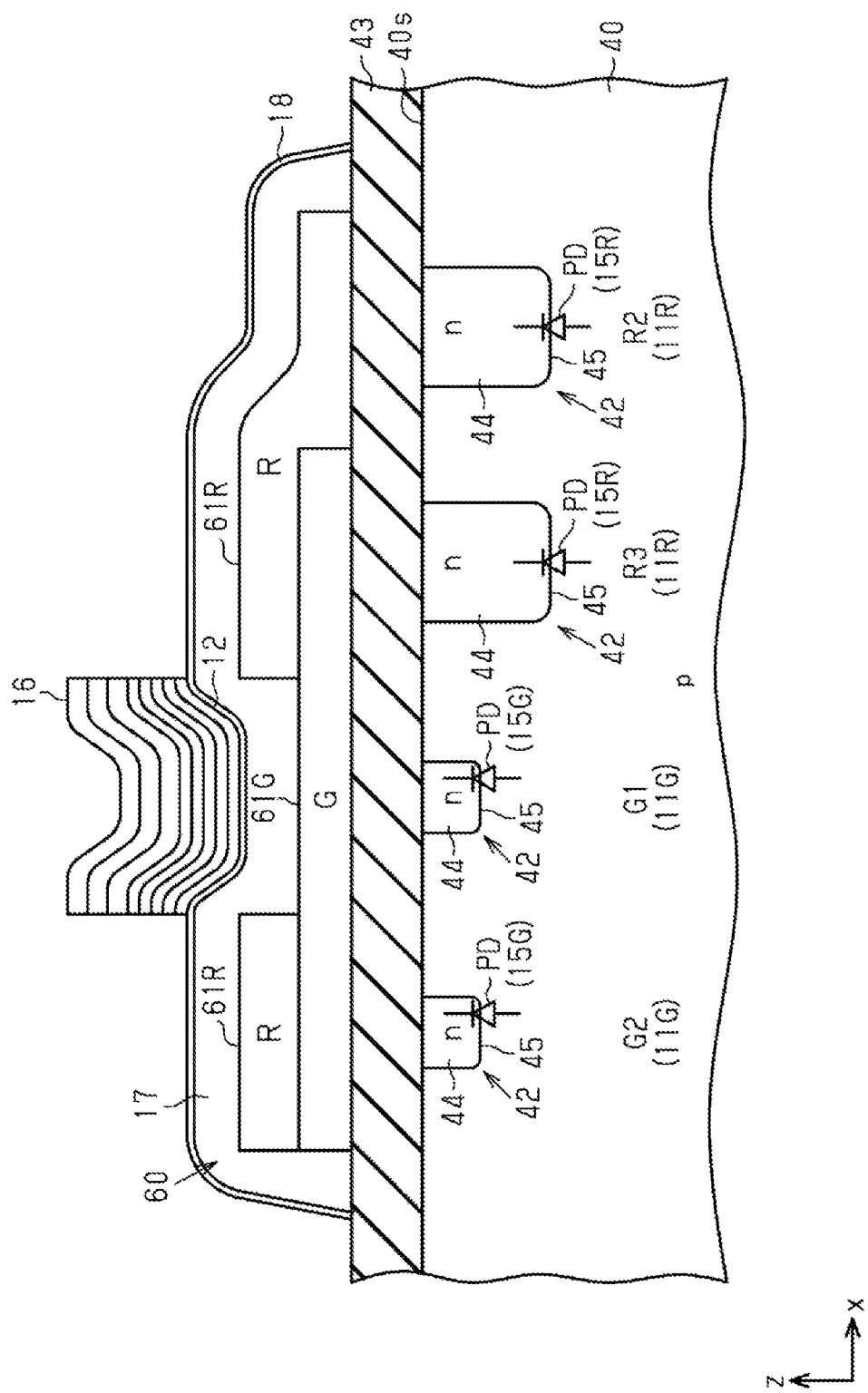
FIG. 20 is a sectional diagram of a light receiving portion according to a variation example.

As shown in FIG. 20, a transparent film 17 may be provided between the color filter 60 and the infrared cutoff filter 12 or the multi-layer filter 16. The transparent film 17 is arranged in a manner of covering all the light receiving portions 11. The transparent film 17 is arranged on the color filter 60, and the red color filter 61R respectively covers the green color filter 61G and the blue color filter 61B. The transparent film 17 includes a transparent filter allowing transmission of light of the visible light band and the infrared wavelength band, for example, including transparent resin such as $TiO_2$. Preferably, the transparent film 17 is formed by way of absorbing a step difference generated by the color filter 60.

The entire surface of the transparent film 17 is covered by a protective film 18. The protective film 18 includes a transparent filter allowing transmission of light of the visible light band and the wavelength band of infrared light. The infrared cutoff filter 12 or the multi-layer filter 16 is arranged on the protective film 18.

According to such configuration, since the transparent film 17 absorbs the step difference formed on the color filter 60, a step difference in a corresponding portion of the step difference between the transparent film 17 and the color filter 60 is reduced. Thus, the infrared cutoff filter 12 and the multi-layer filter 16 can be formed uniformly and without defects. The infrared cutoff filter 12 and the multi-layer filter 16 are formed on the transparent film 17. Moreover, the protective film 18 may be omitted.

What is claimed is:

1. An optical sensor, comprising:
   a plurality of optical receivers;
   a plurality of color filters, covering light receiving surfaces of the plurality of optical receivers;
   a multi-layer filter, layered on the plurality of color filters; and
   an infrared cutoff filter, having a spectral characteristic different from that of the multi-layer filter, and disposed between the multi-layer filter and the plurality of color filters;
   wherein the plurality of color filters comprise:
      a first filter, allowing transmission of light of a first visible light band in a visible light region; and
      a second filter, allowing transmission of light of a second visible light band in the visible light region; and
   wherein the multi-layer filter comprises:
      a first transmission wavelength region, allowing transmission of a portion of light of the first visible light band; and
      a second transmission wavelength region, allowing transmission of a portion of light of the second visible light band or a portion of light of an infrared band on a wavelength side longer than the second visible light band.

2. The optical sensor according to claim 1, wherein
the second transmission wavelength region allows transmission of a portion of light of the second visible light band, and
the multi-layer filter comprises a third transmission wavelength region allowing transmission of a portion of light of the infrared band.

3. The optical sensor according to claim 1, wherein the multi-layer filter comprises:
a first light shielding wavelength region, cutting off light of a wavelength band on a wavelength side shorter than the first transmission wavelength region; and
a second light shielding wavelength region, cutting off light of a wavelength band between the first transmission wavelength region and the second transmission wavelength region.

4. The optical sensor according to claim 2, wherein the multi-layer filter comprises:
a first light shielding wavelength region, cutting off light of a wavelength band on a wavelength side shorter than the first transmission wavelength region;
a second light shielding wavelength region, cutting off light of a wavelength band between the first transmission wavelength region and the second transmission wavelength region;
a third light shielding wavelength region, cutting off light of a wavelength band between the second transmission wavelength region and the third transmission wavelength region; and
a fourth light shielding wavelength region, cutting off light of a wavelength band on a wavelength side longer than the third transmission wavelength region.

5. The optical sensor according to claim 1, wherein
the plurality of optical receivers comprise a first optical receiver, a second optical receiver and a third optical receiver; and
the plurality of color filters comprise:
a red color filter, allowing transmission of light of a red wavelength band, and covering a light receiving surface of the first optical receiver;
a green color filter, allowing transmission of light of a green wavelength band, and covering a light receiving surface of the second optical receiver; and
a blue color filter, allowing transmission of light of a blue wavelength band, and covering a light receiving surface of the third optical receiver; and
the first filter is either the green color filter or the blue color filter,
the first transmission wavelength region overlaps a portion of the green wavelength band or a portion of the blue wavelength band,
the second filter is the red color filter, and
the second transmission wavelength region is on a wavelength side longer than the first transmission wavelength region and in a manner overlapping a portion of the red wavelength band.

6. The optical sensor according to claim 5, wherein the first transmission wavelength region overlaps both a portion of the blue wavelength band and a portion of the green wavelength band.

7. The optical sensor according to claim 5, wherein
the first optical receiver is provided more than one,
one or a plurality of the first optical receivers are covered by a layered structure of the red color filter and the multi-layer filter, and
another one or another plurality of the first optical receivers are covered by the red color filter.

8. The optical sensor according to claim 5, wherein
the second optical receiver is provided more than one,
one or a plurality of the second optical receivers are covered by a layered structure of the green color filter and the multi-layer filter, and
another one or another plurality of the second optical receivers are covered by the green color filter.

9. The optical sensor according to claim 5, wherein
the third optical receiver is provided more than one,
one or a plurality of the third optical receivers are covered by a layered structure of the blue color filter and the multi-layer filter, and
another one or another plurality of the third optical receivers are covered by the blue color filter.

10. The optical sensor according to claim 5, wherein
the second optical receiver and the third optical receiver are respectively provided more than one,
one or a plurality of the second optical receivers are covered by a layered structure of the green color filter and the multi-layer filter,
another one or another plurality of the second optical receivers are covered by the green color filter,
one or a plurality of the third optical receivers are covered by a layered structure of the blue color filter and the multi-layer filter,
another one or another plurality of the third optical receivers are covered by the blue color filter, and
the multi-layer filter covering the one or the plurality of the second optical receivers and the multi-layer filter covering the one or the plurality of the third optical receivers comprise a common multi-layer filter.

11. The optical sensor according to claim 10, wherein the one or the plurality of the second optical receivers covered by the multi-layer filter are disposed adjacent to the one or the plurality of the third optical receivers covered by the multi-layer filter.

12. An optical sensor, comprising:
an optical receiver;
a color filter, covering a light receiving surface of the optical receiver and allowing transmission of light in a visible light band; and
a multi-layer filter, layered on the color filter, the multi-layer filter comprising:
a transmission wavelength region, allowing transmission of a portion of light in the visible light band; and
a light shielding wavelength region, operable to cut off light in the visible light band different from the transmission wavelength region.

13. The optical sensor according to claim 12, wherein
the color filter comprises a blue color filter that allows transmission of light of a blue wavelength band and covers the light receiving surface of the optical receiver,
the transmission wavelength region allows transmission of a portion of light of the blue wavelength band as the visible light band, and
the light shielding wavelength region cuts off light of a wavelength band other than the transmission wavelength region in the blue wavelength band.

14. The optical sensor according to claim 12, wherein
the color filter comprises a green color filter that allows transmission of light of a green wavelength band and covers the light receiving surface of the optical receiver,
the transmission wavelength region allows transmission of a portion of light of the green wavelength band as the visible light band, and
the light shielding wavelength region cuts off light of a wavelength band other than the transmission wavelength region in the green wavelength band.

15. The optical sensor according to claim 12, wherein
the color filter comprises a red color filter that allows transmission of light of a red wavelength band and covers the light receiving surface of the optical receiver,
the transmission wavelength region allows transmission of a portion of light of the red wavelength band as the visible light band, and
the light shielding wavelength region cuts off light of a wavelength band other than the transmission wavelength region in the red wavelength band.

16. The optical sensor according to claim 1, wherein the multi-layer filter comprises a layered structure made of $SiO_2$ and $TiO_2$.

17. The optical sensor according to claim 1, wherein the infrared cutoff filter covers the color filter.

18. The optical sensor according to claim 1, comprising a processor, wherein the processor calculates an intensity of light according to a plurality of output signals obtained from photocurrents that flow as a result of light received by the plurality of optical receivers.

19. An electronic apparatus, comprising:
the optical sensor according to claim 1; and
a frame, accommodating the optical sensor.

* * * * *